(12) United States Patent
Sandler et al.

(10) Patent No.: US 7,249,118 B2
(45) Date of Patent: Jul. 24, 2007

(54) DATABASE SYSTEM AND METHODS

(75) Inventors: Zigmund Sandler, Springfield, MA (US); Vladimir Seroff, New York, NY (US); Scott J. Kolodzieski, Madison, NJ (US); Alexandre Kornilovski, New York, NY (US)

(73) Assignee: Aleri, Inc., Chicago, IL (US)

( * ) Notice: Subject to any disclaimer, the term of this patent is extended or adjusted under 35 U.S.C. 154(b) by 649 days.

(21) Appl. No.: 10/150,763

(22) Filed: May 17, 2002

(65) Prior Publication Data

US 2003/0217033 A1     Nov. 20, 2003

(51) Int. Cl.
G06F 17/30    (2006.01)
G06F 15/16    (2006.01)

(52) U.S. Cl. .............................. 707/1; 707/10; 709/223

(58) Field of Classification Search ..................... None
See application file for complete search history.

(56) References Cited

U.S. PATENT DOCUMENTS

| | | | |
|---|---|---|---|
| 5,204,958 A | 4/1993 | Cheng et al. ............... 395/600 |
| 5,664,160 A | 9/1997 | Fecteau et al. ............. 395/500 |
| 5,778,370 A | 7/1998 | Emerson ..................... 707/100 |
| 5,794,229 A | 8/1998 | French et al. ................... 707/2 |
| 5,842,196 A | 11/1998 | Agarwal et al. ................ 707/2 |
| 5,918,225 A | 6/1999 | White et al. .................... 707/3 |
| 5,963,954 A | 10/1999 | Burrows ...................... 707/102 |
| 6,003,039 A | 12/1999 | Barry et al. ................. 707/103 |
| 6,006,225 A | 12/1999 | Bowman et al. ............... 707/5 |
| 6,009,432 A | 12/1999 | Tarin ........................... 707/10 |
| 6,014,670 A | 1/2000 | Zamanian et al. ........... 707/101 |
| 6,029,170 A | 2/2000 | Garger et al. ............... 707/100 |
| 6,035,306 A | 3/2000 | Lowenthal et al. ......... 707/200 |
| 6,044,374 A | 3/2000 | Nesamoney et al. .......... 707/10 |
| 6,070,158 A | 5/2000 | Kirsch et al. ................... 707/3 |
| 6,073,140 A | 6/2000 | Morgan et al. ............. 707/203 |
| 6,078,918 A | 6/2000 | Allen et al. ..................... 707/6 |
| 6,108,647 A | 8/2000 | Poosala et al. ................ 707/1 |
| 6,108,659 A | 8/2000 | Vincent ....................... 707/101 |
| 6,119,128 A | 9/2000 | Courter et al. ............. 707/202 |
| 6,230,166 B1 | 5/2001 | Velamuri et al. ........... 707/206 |
| 6,286,005 B1 | 9/2001 | Cannon ...................... 707/100 |
| 6,341,388 B1 | 1/2002 | Yach et al. .................. 707/103 |
| 6,377,948 B2 | 4/2002 | Kikuchi et al. ............... 707/10 |
| 6,377,953 B1 | 4/2002 | Gawlick et al. ............ 707/102 |
| 6,377,958 B1 | 4/2002 | Orcutt ........................ 707/200 |
| 6,405,187 B1 | 6/2002 | Egan et al. ..................... 707/2 |
| 6,405,208 B1 | 6/2002 | Raghavan et al. .......... 707/102 |
| 6,408,292 B1 | 6/2002 | Bakalash et al. .............. 707/2 |

(Continued)

OTHER PUBLICATIONS

Blakeley, et al., "Efficiently Updating Materialized Views," Proc. of SIGMOD, Washington, 1986.

(Continued)

*Primary Examiner*—Jeffrey Gaffin
*Assistant Examiner*—Hassan Mahmoudi
(74) *Attorney, Agent, or Firm*—Goodwin Procter LLP

(57) ABSTRACT

In general, in one aspect, the invention relates to a method for transaction processing. The method includes specifying metadata and storing the metadata. An index is created in response to the stored metadata. The method also includes receiving a transaction, generating an index log of changes to the index in response to the received transaction, and modifying the first index in response to the generated index log.

18 Claims, 31 Drawing Sheets

U.S. PATENT DOCUMENTS

| | | |
|---|---|---|
| 6,411,950 B1 | 6/2002 | Moricz et al. ............... 707/3 |
| 6,418,450 B2 | 7/2002 | Daudenarde ............... 707/200 |
| 6,434,544 B1 | 8/2002 | Bakalash et al. ............ 707/2 |
| 6,513,041 B2 | 1/2003 | Tarin ........................ 707/10 |
| 6,832,229 B2* | 12/2004 | Reed ........................ 707/202 |
| 2001/0000536 A1 | 4/2001 | Tarin ........................ 707/102 |
| 2001/0047360 A1 | 11/2001 | Huras et al. ............... 707/102 |
| 2001/0049694 A1 | 12/2001 | Daudenarde ............... 707/200 |
| 2002/0029207 A1 | 3/2002 | Bakalash et al. ............ 707/1 |
| 2002/0035562 A1 | 3/2002 | Roller et al. ................ 707/6 |
| 2002/0055932 A1 | 5/2002 | Wheeler et al. ......... 707/104.1 |
| 2002/0059260 A1 | 5/2002 | Jas .......................... 707/100 |
| 2002/0091696 A1 | 7/2002 | Craft et al. ................. 707/10 |
| 2002/0095421 A1 | 7/2002 | Koskas ..................... 707/100 |
| 2002/0107957 A1 | 8/2002 | Zargham et al. ........... 709/224 |
| 2003/0061537 A1* | 3/2003 | Cha et al. .................... 714/16 |
| 2004/0107286 A1* | 6/2004 | Larson et al. ............... 709/229 |

OTHER PUBLICATIONS

Blakeley, et al., "Updating Derived Relations: Detecting Irrelevant and Autonomously Computable Updates," ACM Transactions on Database Systems, vol. 14, No. 3, Sep. 1989.
Gupta, et al., "Maintaining Views Incrementally," ACM SIGMOD International Conference, Washington, D.C., May 1993.
Griffin, et al., "Incremental Maintenance of Views with Duplicates," Proc. of SIGMOD, 1995.
Dallan Quass, "Maintenance Expression for Views with Aggregation," Proc. of SIGMOD, 1996, Workshop on Materialized Views.
Dimitra Vista, "Optimizing Incremental View Maintenance Expression in Relational Databases," 1996.
Zhao, et al., "On the Performance of an Array-based ADT for OLAP Workloads," Aug. 29, 1996.
Zhao, et al., "Array-Based Evaluation of Multi-Diminesional Queries in Object-Relational Database Systems," Feb. 21, 1997.
"Warehouse Administrator's Guide for UNIX Platforms," Red Brick Warehouse Version 5.1, Chapter 3 "Schema Design," Red Brick, Jan. 1998.
Dennis Shasha, "Time Series in Finance: the array database approach," VLDB Conference, Aug. 1998.
Zhao, et al., "Simultaneous Optimization and Evaluation of Multiple Dimensional Queries," Proc. ACM-SIGMOD, 1998.
Berry, et al., "Matrices, Vector Spaces, and Information Retrieval," SIAM Review, vol. 41, No. 2, pp. 335-362, Apr. 23, 1999.
"Multi-Dimensional Databases and Online Analytical Processing," slide presentation, 1999.
"Informix Red Brick Decision Server," Informix, Version 6.10, Technical Brief, 2000.
Sand Technology Library, "Nucleus Server White Paper," 2001.
Oracle, "Oracle9i Materialized Views," May 2001.
Purcell, et al., "Evolution of Star join Optimization," DB2 Universal Database, Oct. 2001.
"Column-Based Analytical Technology: The Missing Piece of the Data Analytics Puzzle," Alterian, Oct. 2001.
"Nucleus Proves Itself a Super-Scalable iSeries Solution at the Teraplex," IBM, 2001.
"Nucleus Executive Overview," Sand Technology, 2001.
"SAS/Warehouse Administrator 2.2 offers metadata-driven automation," SAS Institute Inc., 2001.
"Project Proposal: Vector database engine," 2002.
"The IDUG Solutions Journal," Solutions Journal, vol. 9 No. 1, Mar. 2002.
Duval, et al., "Metadata Principles and Practicalities," D-Lib Magazine, vol. 8, No. 4, Apr. 2002.
Philip Howard, "Aleri—An Evaluation by Bloor Research," Bloor Research, May 2, 2002.
Stata, et al., "The Term Vector Database: fast access to indexing terms for Web pages," Proc. of the 9th International World Wide Web Conference, Amsterdam, Netherlands, May 2002.
"Red Brick Warehouse," IBM, Downloaded from Web, Aug. 2002.

"Anglo Irish Bank," DecisionWorks Case Study, DecisionWorks, Downloaded from Web, Aug. 2002.
"Innovations in data warehousing—Answering Complex, Real-Time and Dynamic Queries," Bloor Research, Aug. 2002.
"RODIN Data Warehousing," Downloaded from Web, Aug. 2002.
Palpanas, et al., "Incremental Maintenance for Non-Distributive Aggregate Functions," Proc. of VLDB Conference Hong Kong, Aug. 2002.
International Search Report for PCT/US03/15273 dated Jul. 10, 2003 (4 ps.).
Blakeley, et al., "Efficiently Updating Materialized Views," Proc. of SIGMOD, Washington, 1986.
Blakeley, et al., "Updating Derived Relations: Detecting Irrelevant and Autonomously Computable Updates," ACM Transactions on Database Systems, vol. 14, No. 3, Sep. 1989.
Gupta, et al., "Maintaining Views Incrementally," ACM SIGMOD International Conference, Washington, D.C., May 1993.
Griffin, et al., "Incremental Maintenance of Views with Duplicates," Proc. of SIGMOD, 1995.
Dallan Quass, "Maintenance Expression for Views with Aggregation," Proc. of SIGMOD, 1996, Workshop on Materialized Views.
Dimitra Vista, "Optimizing Incremental View Maintenance Expression in Relational Databases," 1996.
Zhao, et al., "On the Performance of an Array-based ADT for OLAP Workloads," Aug. 29, 1996.
Zhao, et al., "Array-Based Evaluation of Multi-Diminesional Queries in Object-Relational Database Systems," Feb. 21, 1997.
"Warehouse Administrator's Guide for UNIX Platforms," Red Brick Warehouse Version 5.1, Chap. 3 "Schema Design," Red Brick, Jan. 1998.
Dennis Shasha, "Time Series in Finance: the array database approach," VLDB Conference, Aug. 1998.
Zhao, et al., "Simultaneous Optimization and Evaluation of Multiple Dimensional Queries," Proc. ACM-SIGMOD, 1998.
Berry, et al., "Matrices, Vector Spaces, and Information Retrieval," SIAM Review, vol. 41, No. 2, pp. 335-362, Apr. 23, 1999.
"Multi-Dimensional Databases and Online Analytical Processing," slide presentation, 1999.
"Informix Red Brick Decision Server," Informix, Version 6.10, Technical Brief, 2000.
Sand Technology Library, "Nucleus Server White Paper," 2001.
Oracle, "Oracle9i Materialized Views," May 2001.
Purcell, et al., "Evolution of Star join Optimization," DB2 Universal Database, Oct. 2001.
"Column-Based Analytical Technology: The Missing Piece of the Data Analytics Puzzle," Alterian, Oct. 2001.
"Nucleus Proves Itself a Super-Scalable iSeries Solution at the Teraplex," IBM, 2001.
"Nucleus Executive Overview," Sand Technology, 2001.
"SAS/Warehouse Administrator 2.2 offers metadata-driven automation," SAS Institute Inc., 2001.
"Project Proposal: Vector database engine," 2002.
"The IDUG Solutions Journal," Solutions Journal, vol. 9, No. 1, Mar. 2002.
Duval, et al., "Metadata Principles and Practicalities," D-Lib Magazine, vol. 8, No. 4, Apr. 2002.
Philip Howard, "Aleri—An Evaluation by Bloor Research," Bloor Research, May 2, 2002.
Stata, et al., "The Term Vector Database: fast access to indexing terms for Web pages," Proc. of the 9th International World Wide Web Conference, Amsterdam, Netherlands, May 2002.
"Red Brick Warehouse," IBM, Downloaded from Web, Aug. 2002.
"Anglo Irish Bank," DecisionWorks Case Study, DecisionWorks, Downloaded from Web, Aug. 2002.
"Innovations in data warehousing—Answering Complex, Real-Time and Dynamic Queries," Bloor Research, Aug. 2002.
"RODIN Data Warehousing," Downloaded from Web, Aug. 2002.
Palpanas, et al., "Incremental Maintenance for Non-Distributive Aggregate Functions," Proc. of VLDB Conference Hong Kong, Aug. 2002.

* cited by examiner

Figure 15A:
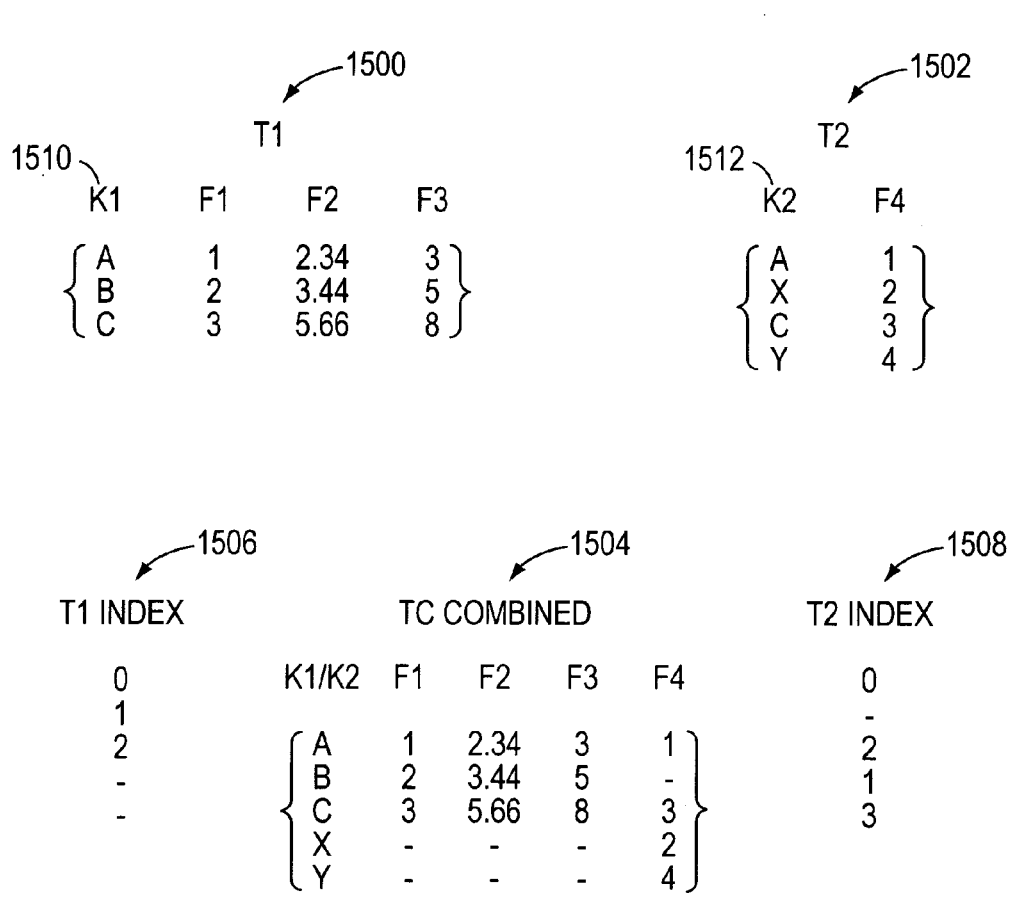

```
                    ┌─1500                                    ┌─1502
                    T1                                         T2
1510┐                                    1512┐
    K1    F1    F2     F3                    K2    F4
   ⎧ A     1   2.34    3 ⎫                  ⎧ A     1 ⎫
   ⎨ B     2   3.44    5 ⎬                  ⎪ X     2 ⎪
   ⎩ C     3   5.66    8 ⎭                  ⎨ C     3 ⎬
                                            ⎩ Y     4 ⎭
```

```
      ┌─1506              ┌─1504                    ┌─1508
    T1 INDEX            TC COMBINED                T2 INDEX

T1-LOG

| OPER | INDEX | K1 | F1 | F2 | F3 |
|------|-------|----|----|----|----|
| { i  | 3     | D  | 5  | 4.77 | 0 } |

1520

*1528

COMBINED LOG

| OPER | INDEX | K1/K2 | F1 | F2 | F3 | F4 |
|------|-------|-------|----|----|----|----|
| { i  | 5     | D     | 5  | 4.77 | 0 | - } |

*1524

T1 INDEX-LOG

| OPER | INDEX | VALUE |
|------|-------|-------|
| { i  | 5     | 3 }   |

*1526

T2 INDEX-LOG

| OPER | INDEX | VALUE |
|------|-------|-------|
| { i  | 5     | - }   |

T1-LOG

| OPER | INDEX | K1 | F1 | F2 | F3 |
|------|-------|----|----|-----|----|
| { u  | 1     | B  | 2  | 9.99 | 5 } |

1540

_1544

COMBINED LOG

| OPER | INDEX | K1/K2 | F1 | F2 | F3 | F4 |
|------|-------|-------|----|----|-----|----|----|
| { u  | 1     | B     | 2  | 9.99 | 5  | - } |

FIG. 15C

T1-LOG ~1622

| OPER | INDEX | K1 | F1 | F2 | F3 |
|------|-------|----|----|----|----|
| u    | 1     | B  | 2  | 1.21 | 9 |
| i    | 5     | Y  | 2  | 4.77 | 0 |

1620 → u row; 1621 → i row

COMBINED LOG ~1634

| OPER | INDEX | K1/K2 | F1 | F2 | F3 | F4 |
|------|-------|-------|----|----|----|----|
| u    | 1     | B     | 2  | 1.21 | 9 | X |
| i    | 5     | Y     | 5  | 4.77 | 0 | X |

1630 → u row; 1632 → i row

T1 INDEX-LOG ~1638

| OPER | INDEX | VALUE |
|------|-------|-------|
| i    | 5     | 5     |

1636

T2 INDEX-LOG ~1628

| OPER | INDEX | VALUE |
|------|-------|-------|
| u    | 1     | 1     |
| i    | 5     | 1     |

1624 → u row; 1626 → i row

FIG. 16B

┌─1728                              ┌─1722
                 COMBINED LOG                          T2-LOG

OPER  INDEX  K1   K2   F1/4         OPER  INDEX   F4   K2
        ⎧ i     6     3    50   B ⎫    1720 ⎯{ i    4     B   50 }
        ⎨ i     5     5    50   B ⎬
        ⎩                         ⎭

┌─1724                              ┌─1726
              T1 INDEX-LOG                        T2 INDEX-LOG

OPER  INDEX  VALUE                 OPER  INDEX  VALUE
         ⎧ i     6     2 ⎫                  ⎧ i     6     4 ⎫
         ⎨ i     7     4 ⎬                  ⎨ i     7     4 ⎬
         ⎩               ⎭                  ⎩               ⎭

FIG. 17B

… # DATABASE SYSTEM AND METHODS

FIELD OF THE INVENTION

The invention relates to computer-based data processing, more particularly, to database management systems.

BACKGROUND OF THE INVENTION

Data in database management systems are typically stored in the form of records, or tuples, each composed of a fixed number of fields, also referred to as attributes. The fields of a record contain the data associated with that record. Frequently, database records are presented logically in the form of a table, with records as the rows of the table, and attributes as the columns. Systems typically store records in memory and/or on disk or other media as a linked list, with data for each record stored together. However, the data for adjacent records or even adjacent values of the same field are not necessarily stored in any particular proximity or order.

The manner in which the data is stored presents inherent limitations on the performance of database systems. For example, typically, on-line transaction processing (OLTP) is performed using one database system or computer, and on-line analytical processing (OLAP) is performed on another computer. Data typically is offloaded from a transaction processing system to a data warehouse, and the data in the data warehouse is used for analytical processing. There frequently are significant time delays associated with the transfer of data from one system to another. Analytical processing frequently takes a significant amount of time. Typically, the analytical processing on a data warehouse is performed on an entire table or set of tables, even when only a small portion of the table(s) changed. This also can be very inefficient in time and resources.

SUMMARY OF THE INVENTION

In view of the foregoing, there is a need for systems and methods to store and manipulate data so as to avoid the inefficiencies of the prior art. Embodiments of the present invention, for example, perform transaction processing and traditional analytical processing without use of a separate data warehouse, and further, are capable of providing real-time analytical processing of transaction data.

In general, in one aspect, a declarative, vectorized, metadata-enabled, relational query language supports heterogeneous and homogeneous data sources. The language allows for specification of vertical and horizontal vectorized functions, and uses a construct (for example, a "mapping" function) that can be used to simply specify complex rules and relationships such as those specified in a directed acyclic graph. Using another language such as SQL, a database user would typically need to specify query terms such as FROM, WHERE, GROUP BY, ORDER BY, and HAVING, to design such a query, but here the user only specifies relationships between table columns. User's query language code is processed and converted into metadata that describes tables and relationships between the tables. That metadata is then used throughout the system to enable features that previously were not possible, as part of batch processing, transaction processing, OLAP and SQL query processing, internal and external checkpointing, and so on.

In general, in one aspect, the invention relates to a method for transaction processing. The method includes specifying metadata and storing the metadata. An index is created in response to the stored metadata. The method also includes receiving a transaction, generating an index log of changes to the index in response to the received transaction, and modifying the first index in response to the generated index log.

The metadata can include a description of database elements and relationships between the database elements. The metadata can also include a description of database elements required for a query. The metadata can also include a functional description of the relationships between database elements, and can include a description of data dependencies between database elements.

The step of specifying metadata can be performed through use of a user interface operated by a user. In one embodiment, the user interface is a graphical user interface that allows for graphical display and modification of the metadata.

In one embodiment, the receiving step, the generating step, and the modifying step are performed by a transaction subsystem. The transaction can be, for example, an insert, update (i.e. modify), or remove (i.e. delete) operation to a data table. Based on the metadata and the log, additional database changes required by the transaction may be determined.

In some embodiments, the step of modifying the first index is performed when the transactions are complete.

Embodiments of the method can be implemented by a database system for transaction processing. The system includes metadata, a database for storing the metadata, and a transaction processing subsystem or module for creating a first index in response to the stored metadata, receiving a transaction, generating an index log of changes to the first index required by the received transaction, and modifying the first index based on the generated index log.

In one embodiment, the system includes a transaction manager for managing the state of the transaction processing subsystem; an adapter manager for receiving information on transaction sources from the transaction manager; an adapter listener in communication with the adapter manager for receiving transaction data from a queued transaction data source; a resource manager in communication with the adapter listener for receiving data from an adapter listener and for logging collected data; a minimum recalculation engine for recalculating portions of database tables in response to the logged collected data and the metadata; an internal check point manager for committing logged collected data to a database table; and an external checkpoint manager for publishing changes to target databases. In various embodiments there can be one or more of each of the elements. For example, the system can include a second resource manager in communication with a second adapter listener for receiving transaction data from a second queued transaction data source and for logging collected data.

The minimum recalculation engine recalculates portions of database tables in response to the logged collected data and the metadata. Typically, the minimum recalculation engine performs calculations only on data that has changed. In preferred embodiments, the minimum recalculation engine performs table operations on indices that represent results of operations.

In general, in another aspect, the invention relates to a database system. The database system includes a database storing data and metadata describing database elements and relationships between the database elements; a transaction processing subsystem for processing transactions and updating the database; and a user interface for querying the database and continuously providing updated query results as transactions are processed by the transaction processing subsystem.

There can be one or more of each of these elements; the system can include a second database storing data, and the transaction processing system can update the first database and the second database. The user interface can include a web browser in communication with a web server, wherein the web server provides the results to the web browser for display to a user.

In general, in another aspect, the invention relates to a database system. The system includes a vectorized database storing table data fields linearly as a block of contiguous data; a database storing metadata describing database elements and relationships between database elements; a user interface for querying the database and providing updated query results; and a batch processing subsystem for processing batch queries.

In some embodiments, the batch processing subsystem uses a memory model selected from the set of vertical partitioning, horizontal partitioning, and a blend of vertical partitioning and horizontal partitioning. In some embodiments, the system also includes a transaction processing subsystem, such as that described above. In some embodiments, the system also includes a user interface as described above. The user interface can include a web server in communication with a web browser or applet.

In general, in another aspect, the invention relates to a method for external checkpointing. The method includes initially communicating a data table and a log comprising entries of data table transactions to a subscriber; and communicating additional log entries to the subscriber when they are received. The method includes determining that the number of log entries is above a predetermined threshold, applying the log entries to the data table, and communicating the updated data table to the subscriber. In some embodiments, the subscriber is an OLAP server or other database system. Embodiments of the method can be implemented in a checkpointing subsystem that includes a transmitter for initially communicating a data table and a log comprising entries of data table transactions to a subscriber; and for communicating additional log entries to the subscriber when they are received.

In general, in another aspect, the invention relates to a method for fault-recoverable, non-blocking checkpointing of table data. A first copy of a data table and a second copy of the data table are stored. A log comprising entries of data table transactions is received. The log entries are applied to the first copy of the table. When the application of the log entries to the first copy of the table is complete, the log entries are applied to the second copy of the data table. The first copy of the table and the second copy of the table are swapped, and the log entries are applied to the second copy of the table.

In one embodiment, the first copy of the data table and the second copy of the data table are stored on disk. The swapping step then includes renaming the first copy of the table and renaming the second copy of the table. The copies can also be stored in some combination of memory and on disk. In some embodiments, the logs include entries such as inserts, edits, and deletes to the data table. In some embodiments, the step of applying the logs to the first copy of the table comprises modifying the copy of the table in response to the log entries. The logs can be archived once they are applied to the second copy of the table.

This method is also applicable to fault recovery. In such a case, the step of receiving a log comprises receiving a log of data table transactions comprising entries already applied to the first copy of the table before an interruption and entries not applied to the first table before the interruption. The step of applying the log to the to the first copy of the table includes applying the unapplied log entries to the first copy of the table, or the step of applying the log entries to the second copy of the table includes applying unapplied log entries to the second copy of the table, as appropriate.

Embodiments of such a method can be implemented in a checkpointing subsystem configured for fault-recoverable, non-blocking checkpointing of table data. Such a subsystem can include a data store for storing a first copy of a data table and a second copy of the data table, and a receiver for receiving logs of data table transactions. The subsystem can also include a first updater for applying the logs to the first copy of the table; a swapper for swapping the first copy of the table and the second copy of the table; and a second updater for applying the logs to the second copy of the table. The first and second update can be the same or different updaters.

BRIEF DESCRIPTION OF THE DRAWINGS

The invention is identified with particularity in the claims. The advantages of the present invention may be better understood by referring to the following description and the accompanying drawings, in which:

FIGS. 15A-C show an example of the handling of transactions in a fuse operation in accord with minimal recalculation methods of the present invention;

FIGS. 16A-B show an example of the handling of transactions in a link operation in accord with minimal recalculation methods of the present invention;

FIGS. 17A-C show an example of the handling of transactions in a loop operation in accord with minimal recalculation methods of the present invention;

In the drawings, like reference characters generally refer to the same parts throughout the different views. The drawings are not necessarily to scale, emphasis instead being placed upon illustrating the principles of the invention.

DETAILED DESCRIPTION OF THE INVENTION

In brief overview, embodiments of the present invention provide a database system that is suitable for on-line transaction processing (OLTP) and traditional on-line analytical processing (OLAP). Further embodiments can provide real-time OLAP for instantaneous decision support. The architecture of the database system enables updating of OLAP requests in real-time with data received from newly-processed transactions. This capability is realized, in part, through data vectorization and the efficient use of indexing to accelerate calculations and database operations.

Figure 1:
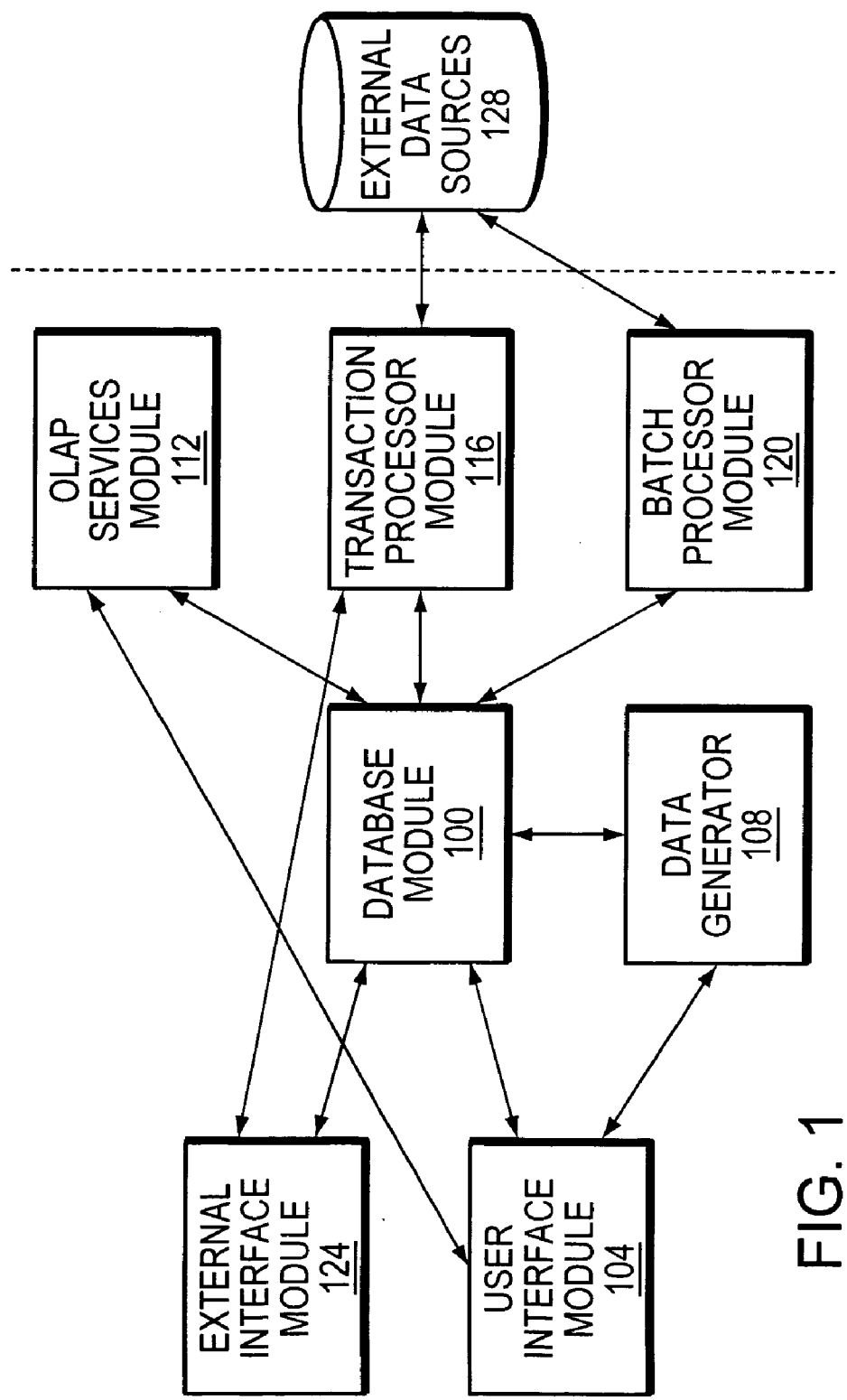
FIG. 1 illustrates an embodiment of a database system in accord with the present invention.

FIG. 1 presents an embodiment of a database system in accord with the present invention. The database system includes a database module 100 in direct or indirect communication with a user interface module 104. The database module 100 provides both traditional database and data warehouse functionality. The database module 100 may also provide tools for viewing and editing metadata associated with the data contained in the database module 100 or elsewhere. The user interface module 104 serves as an access point for privileged and non-privileged users to interact with the database system. Embodiments of the user interface module 104 range from character-driven terminal systems to thin-client graphical user interface (GUI) systems, such as web browsers and other client software applications.

Depending on the functionality desired from the database system, the system may optionally include one or more of a data generator module 108, an OLAP services module 112, a transaction processor module 116, a batch processor module 120, and an external interface module 124. The data generator module 108 is useful for system diagnostics. For example, the data generator module 108 may generate large, complex data sets to test the scalability of a database system and provide heuristic feedback to the user enabling fine-grained tuning of the application. The OLAP services module 112, transaction processor module 116, and batch processor module 120 interact with the database module 100 to provide support for traditional OLAP, OLTP, and real-time OLAP.

The external interface module 124 defines a set of application programming interfaces (APIs) for third-parties to use when developing software that interacts with the database system. The database system may also communicate with one or more external data sources 128, including both queued and non-queued data sources. Exemplary queued data sources include those provided by Tibco, MQ Series, and Tandem. Exemplary nonqueued data sources include those provided by DB 2, Oracle and SQL Server, and flat data files.

The components of the database system may be implemented as individual software processes in a single-processor or multi-processor computing environment. Particular components may be especially suited to implementation on specialized hardware, such as a network of workstations (NOW), as discussed in greater detail below. It is understood that these components, when present, may be directly or indirectly connected in various configurations in accord with the teachings of the present invention. Accordingly, the interconnections illustrated in FIG. 1 are exemplary and are not to be viewed as limiting the scope of the invention, as set forth in the claims.

Figure 2:
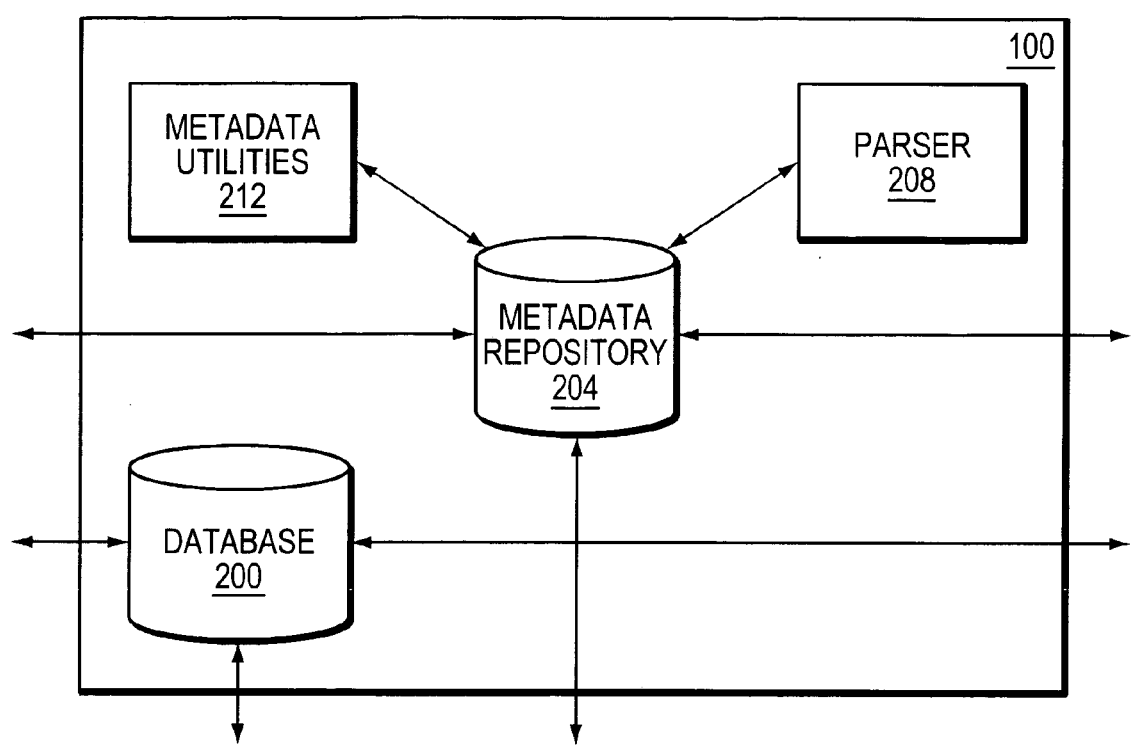
FIG. 2 depicts an embodiment of the database module 100 of FIG. 1.

FIG. 2 illustrates one embodiment of the database module 100. The database module includes a database 200 and a metadata repository 204 in communication with parser 208 and metadata utilities 212. The database 200 stores data, indices, logs, and static metadata for use by the other modules in the system. The metadata repository 204 contains metadata associated with the data in database 200. Typical metadata includes, for example, defined keys, defined rules, and the dependencies between various fields in a pending query (such as sources, targets and mappings). In one embodiment, the metadata repository 208 is stored in an SQL server or other relational database, and can be accessed using standard SQL queries. In other embodiments, the metadata repository 208 is stored in a vectorized database, such as that described below. Processes which provide system functionality can be controlled by variables stored in metadata repository 204 whose values are set by a user via a user interface.

Database 200 stores the data used by the system, as well as the indices and logs that are generated by the system for its internal use. Like a table in a traditional relational database, each table or "relation" stored in the database 200 is composed of columns and rows. Each row entry in the table contains related data, also called a record, and each column in the table specifies an atiribute of the record. Table data is stored column-wise, that is, as vectors with data fields stored linearly as one large block of contiguous data (e.g., in a file). To facilitate vectorization, the length of the columns in the table is uniform, as is the data type of the entries in a particular column.

This column-wise storage of data has numerous advantages. First, since the data in a column is stored contiguously, it can be read into memory quickly, without seek time associated with reading data scattered across a disk. Second, since each data element in a column is of a fixed size, it is relatively simple, for example, to determine the location of the data associated with a particular record as an offset from the start of the file containing the column. Likewise, it is straightforward to read selected portions of a column from disk into memory because the structure of the data stored on the disk is the structure of the data as it is to be stored in memory. Thus, there is no need to allocate a buffer memory or perform any transformation between reading the data from the disk and storing the data in memory. The column-wise storage of data also facilitates random accesses into the data, since the data stored on disk can be traversed directly without any intermediary loading or transformation into a memory.

In one embodiment, the system maintains range indices for each key field column and index column stored in the database. For each fixed-size "chunk" of a column (or index), the range indices contain maximum and minimum values of the data in that chunk. This information can be used to increase the efficiency of certain operations, such as table joins, searches, or identifying minimum or maximum values, without requiring significant additional storage relative to the size of a column.

For example, suppose that a column had 700 million entries, and that the chunk size for the column is 10,000 entries. The column would have a range index with 70,000 entries (which is small compared to the 700 million entries of the column), with each entry storing the minimum and maximum values in that chunk of the column. When a search is performed against the table looking for a particular value in that column, the desired value can first be compared to the minimum and maximum values for each chunk, and chunks for which the desired value does not fall within the range defined by the minimum and maximum values need not be searched, read, or accessed in any way.

The range indices may be updated as data are inserted, updated, and deleted from the column. When the data are inserted, updated, or deleted during transaction processing, updates to range indices are stored as edits in logs for the range indices. The use of logs to support changes to data and indices is also discussed below.

To reduce the user effort required to implement vector operations, in one embodiment the database system includes support for a functional programming language. In this embodiment, the system is designed to accept database queries in the language and, using a system of tailored data structures and overloaded operators, translate the queries into efficient vector operations that are suitable for parallel processing. Other embodiments of the present invention may support traditional query languages such as SQL. In another embodiment, the entire system is written in the functional programming language, while in still other embodiments the database system is written in a conventional programming language such as C, C++, or C#.

Since the language is column oriented, the computations for each column can be specified and performed independently. In contrast, languages like SQL require that complex queries be created to deal with separate aggregations over many columns. For example, the following functional language specification:

```
Declare Maps (ConsolidatedPL.TickerSymbol, Positions.TickerSymbol; ConsolidatedPL.
TraderID, Positions.TraderID)
ConsolidatedPL.TickerSymbol = Positions.TickerSymbol
ConsolidatedPL.TraderID = Positions.TraderID
ConsolidatedPL.IndustryName = Securities.IndustryName
ConsolidatedPL.MarketValue = Positions.Holding * Securities.MarketPrice
ConsolidatedPL.TotalPLbyTrader = FINDSUMVAL ((Positions.Holding *
                (Securities.MarketPrice - Positions.PurchasePrice) + Settled.RealizedPL),
                ConsolidatedPL.TraderID)
ConsolidatedPL.TotalPLbyIndustry = FINDSUMVAL ((Positions.Holding *
                (Securities.MarketPrice - Positions.PurchasePrice) + Settled.RealizedPL),
                ConsolidatedPL.IndustryName)
is equivalent to the following SQL code:
WITH PL AS
                (SELECT P.TraderID AS Trader,
                    P.TickerSymbol AS TickerSymbol,
                    S.IndustryName AS Industry,
                    S.MarketPrice * P.Holding AS MarketValue,
                    P.Holding * (S.MarketPrice - P.PurchasePrice) AS UnrealizedGain,
                    T.RealizedGain AS RealizedGain)
                FROM
                    (Positions.P FULL OUTER JOIN Settled.T
                ON P.TraderID = T.TraderID AND P.TickerSymbol = T.TickerSymbol)
                JOIN Securities.S
                ON P.TickerSymbol = S.TickerSymbol),
        ByTrader AS
                (SELECT Trader AS Trader, SUM(UnrealizedGain + RealizedGain) AS
        TotalPLbyTrader
                FROM PL
                GROUP BY Trader),
        ByIndustry AS
                (SELECT Industry AS Industry,
                    SUM(UnrealizedGain + RealizedGain) AS TotalPLbyIndustry
                FROM PL
                GROUP BY Industry),
SELECT PL.Trader AS Trader,ID PL.TickerSymbol AS TickerSymbol,
        PL.MarketValue AS MarketValue,
        ByTrader.TotalPLbyTrader AS TotalPLbyTrader,
        ByIndustry.TotalPLbyIndustry AS TotalPLbyIndustry
FROM PL, ByTrader, ByIndustry
WHERE
        PL.Trader = ByTrader.Trader
        PL.Industry = ByIndustry.Industry
```

In one embodiment, the parser 208 accepts queries and transforms the queries into directed acyclic graphs, where each node in the graph represents a data structure and each line in the graph represents an operation on its connected data structures. At compile time, the parser 208 can identify and eliminate circular dependencies to construct the graphs and improved JOIN strategies. In one embodiment, the parser 208 is itself written in the functional programming language.

The metadata utilities 212 provide a convenient point of access to the metadata contained in the metadata repository 204. The utilities, in various embodiments, provide different functionality. For example, one utility $212^1$ exports metadata to computer-aided software engineering (CASE) tools. Another utility $212^2$ draws graphs for a user using the metadata in the repository 204 to visually depict the metadata.

Figure 3:
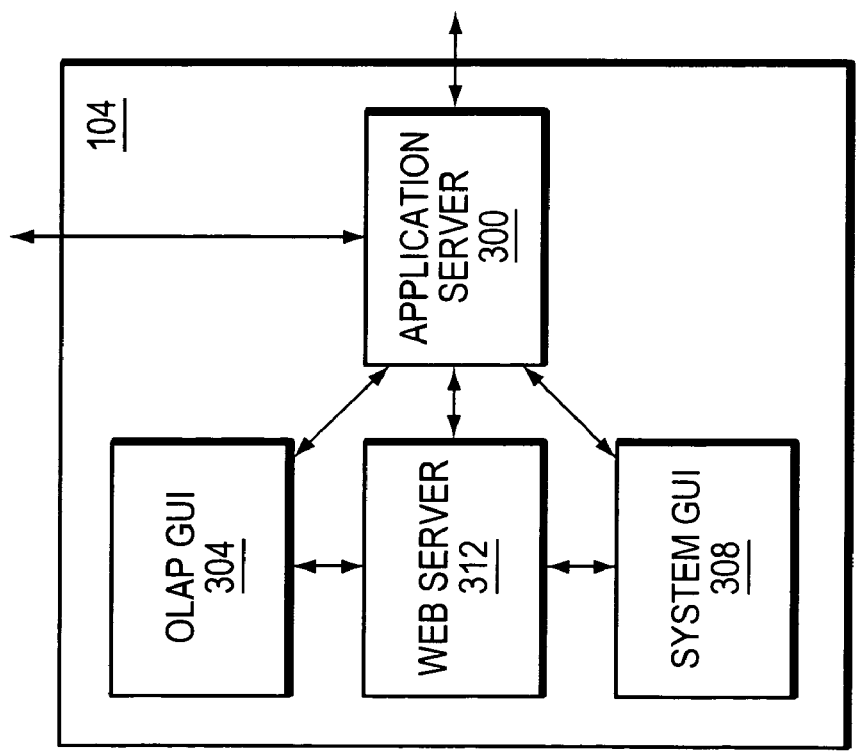
FIG. 3 shows an embodiment of the user interface module 104 of FIG. 1.

One embodiment of the user interface module 104 presented in FIG. 3. In this embodiment the user interface module 104 includes an application server 300 in communication with one or more executable programs, such as OLAP GUI 304, system GUI 308, or web server 312. In another embodiment of the user interface module 104, the application server 300 may be a gateway server, and the gateway server, the OLAP GUI 304 and system GUI 308 may be implemented in Java and packaged as Java archive (.JAR) files.

In operation, an end user interacts with the database system using a web browser (not shown). The browser connects with the web server 312, which provides the web browser with one or more files written in hypertext markup language (HTML). The files typically include a reference to a location storing a program providing the functionality of OLAP GUI module 308 or Modeller GUI 308. The user's computer downloads the program and executes it, permitting the user to manipulate the graphical elements of the program. Manipulating the graphical elements sends messages to the application server 300 which in turn passes them to the database system for processing. The application server 300 may also receive completed results from the database server and provide them to the GUI 304, 308. In one embodiment, the application server 300 also includes configuration data, such as the location of the metadata repository 204.

Figure 4:
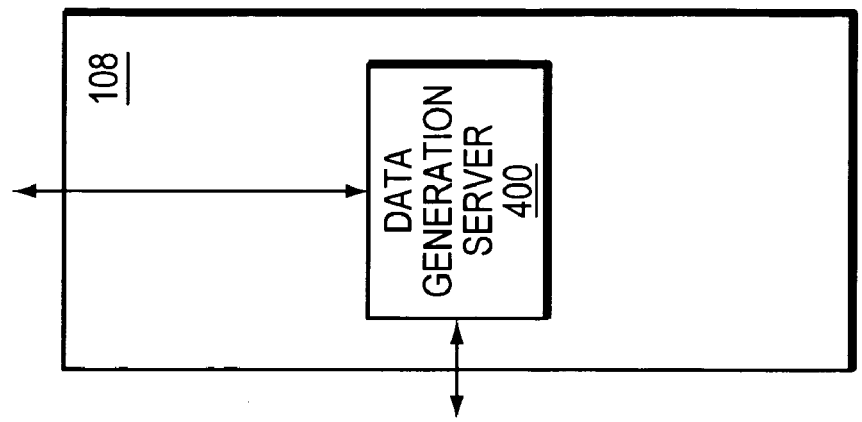
FIG. 4 depicts an embodiment of the data generator module 108 of FIG. 1.

FIG. 4 illustrates one embodiment of the data generator 108 including a data generation server 400. In one embodiment, the data generation server 400 generates test data sets based on a database model described in the metadata repository 204. The data generation server 400 may accept inputs specifying a desired range of values and overlap and then generate a data set satisfying the specified values. With a test data set of sufficient size, it is possible to explore the scalability of the database model and perform quality assurance tests.

Figure 5:
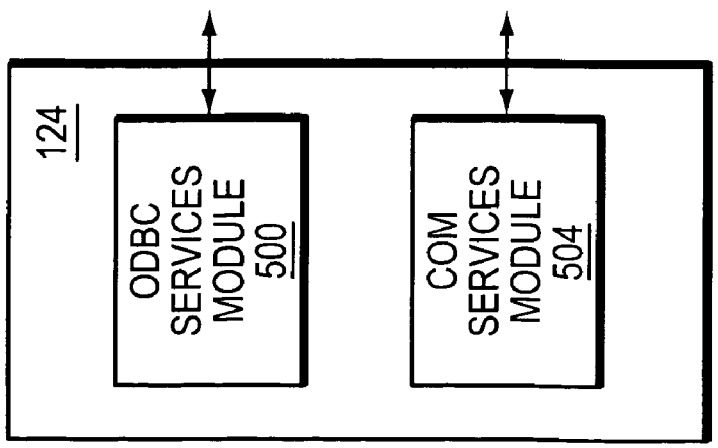
FIG. 5 shows an embodiment of the external interface module 124 of FIG. 1.

FIG. 5 illustrates one embodiment of the external interface module 124, which to facilitate interoperability with third-party software products. In one embodiment, the external interface module includes an open database connectivity (ODBC) services module 500 and/or a common-object model (COM) services module 504. The ODBC module 500 exposes distributed SQL and SQL ODBC interfaces to third-party products such as MICROSOFT EXCEL and MICROSOFT ACCESS. The COM services module 504 exposes a COM interface for use with third-party software products that support COM.

Distributed Database Queries

In another embodiment, the ODBC services module 500 communicates with a distributed database system (not shown) for the evaluation of SQL queries over a star schema. The distributed database system may be implemented on a massively-parallel computer or a network of workstations having separate processors and memory. A master process separates the tables in the database 200 into smaller data tables for distribution and storage on individual computer nodes. The master process also reduces database queries into subqueries on subsets of the tables and routes the appropriate subquery to the node having the relevant table subset. The node computes a partial result and returns it to the master process for aggregation and final assembly of the results, e.g., by processing the "group by," "having," and "order by" clauses of the SQL query.

In one embodiment, the database 200 is organized in a star schema with very large fact tables and relatively smaller lookup tables. The number of fact tables may be restricted to one fact table and, likewise, a restriction may be implemented prohibiting the joining of fact tables for the purpose of allowing specific optimizations. In this embodiment, a lookup table may, for example, be delegated to a computer node for processing.

The data in the tables in database 200 may be vertically partitioned, i.e., vectorized, facilitating the parallelization of database query processing as described above. For example, many queries result in the examination of all of the rows of a table and a subset of the table's columns when each column represents a field and each row represents an entry in the table. The data in the fact tables may also be horizontally partitioned into sizes that are appropriate to the processing power of the individual computer nodes. In one embodiment, a user may manually specify a minimum or maximum size for a partitioned table, or specify a load factor that expresses the computational capability, and therefore the appropriate chunk size, of the computing node relative to the other nodes in the network.

In one embodiment where the distributed database system is implemented on a network of workstations, the system includes three sets of functionality: a mechanism for controlling the processes executing on individual workstations in the network, a mechanism for distributing the data contained in fact tables to individual workstations, and a query engine.

The processes on the individual workstations are controlled through a universal interface. Each workstation in the network runs a process that can identify the available disk space or CPU time on the workstation, load new or replacement software, and start or stop individual software programs. In a further embodiment, the process is fault-tolerant such that in the event of a system failure or restart, the process itself automatically restarts and resumes the execution of the software that was active prior to the failure.

The distribution of data is controlled by one or more data distribution servers. The data distribution server listens for updates from a data source—e.g., a streaming source, packages the updates into a group, selects a target workstation to receive the update, publishes the update, waits for a response, and selects another workstation if the first one fails. Each workstation executes a data server that listens for updates published by the data distribution servers; the data servers make updates to the local, partial copies of the fact tables. In another embodiment, the data distribution server publishes updates to one or more backup locations and tracks where updates have been distributed.

Queries to the distributed database system are handled by a query master process that may be replicated on one or more workstations to achieve fault tolerance. The query master breaks a query into subqueries, identifies the appropriate target workstations to execute the subqueries, transmits the subqueries to the query server processes on these machines, waits for responses from the query servers, and assembles the partial results into full results. The query servers upon receiving the subqueries, pass the subqueries to query engine processes that perform the actual execution of the subqueries. In one embodiment, where each workstation is a multiprocessor computer, the query engine process is adapted to utilize one or more of the processors in the workstation. The query engines provide their results to the query server, which forwards the results to the query master. In some cases, the query master may assemble the results by a simple union of the partial results, while in other cases, the results may be assembled by combining the subqueries.

In another embodiment, the distributed database system also provides a interface to the user for controlling the distribution of software to various workstations in the network, and for starting and stopping the execution of software on those machines.

Figure 6:
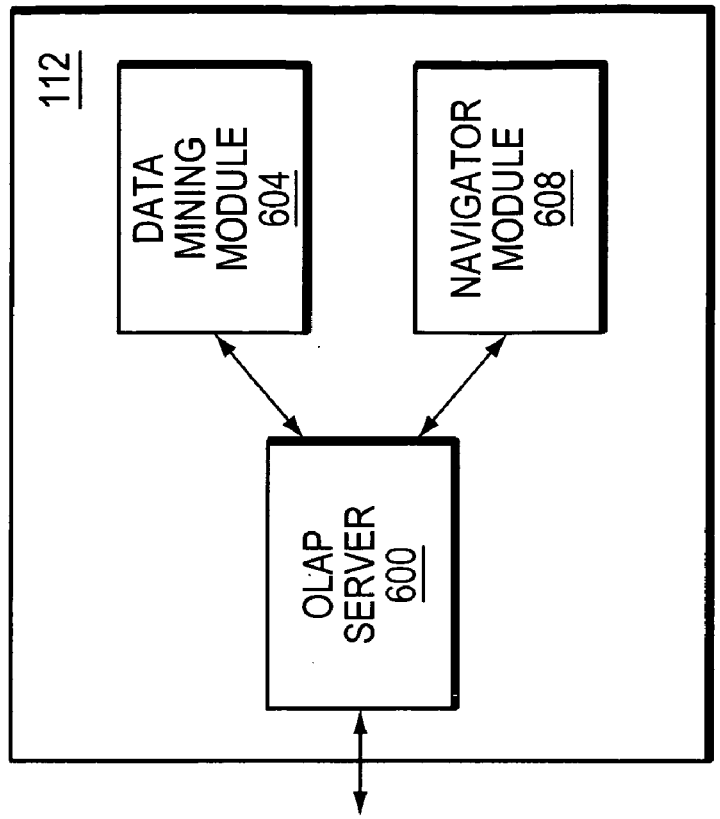
FIG. 6 illustrates an embodiment of the OLAP services module 112 of FIG. 1.

Referring to FIG. 6, in one embodiment the OLAP services module 112 includes an OLAP server 600 in communication with a data mining module 604 and a navigator module 608. The data mining module 604 supports complex queries intended to uncover information hidden in the data. The navigator module 608 permits a user to perform a "drill-down" inspection on the data contained in database 200.

Figure 7:
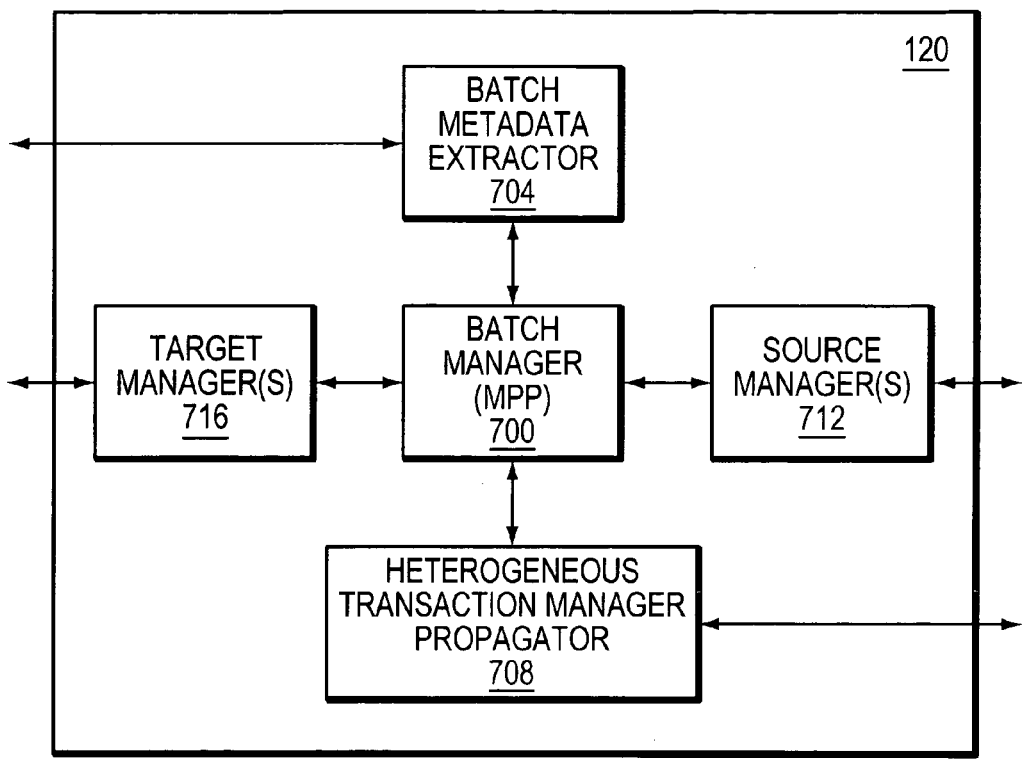
FIG. 7 depicts an embodiment of the batch processor module 120 of FIG. 1.

Referring to FIG. 7, in one embodiment the batch processor module 120 includes a batch manager 700 in communication with a batch metadata extractor 704, a heterogeneous transaction manager propagator 708, one or more source manager(s), generically 712, and one or more target manager(s), generically 716.

The source managers 712 receive data from one or more sources and converts the data to an internal database format called a delta or d-table, also discussed below. In one embodiment, each source manager 712 is adapted to receive data from a particular data source.

The batch metadata extractor 704 retrieves computational rules from the metadata repository 204 for processing by the batch manager 704. The batch manager receives the rules and the delta tables and applies them to construct relations of derived values called gammas or g-tables in a heterogeneous, vectorized format.

Transaction Processing Subsystem

Figure 8:
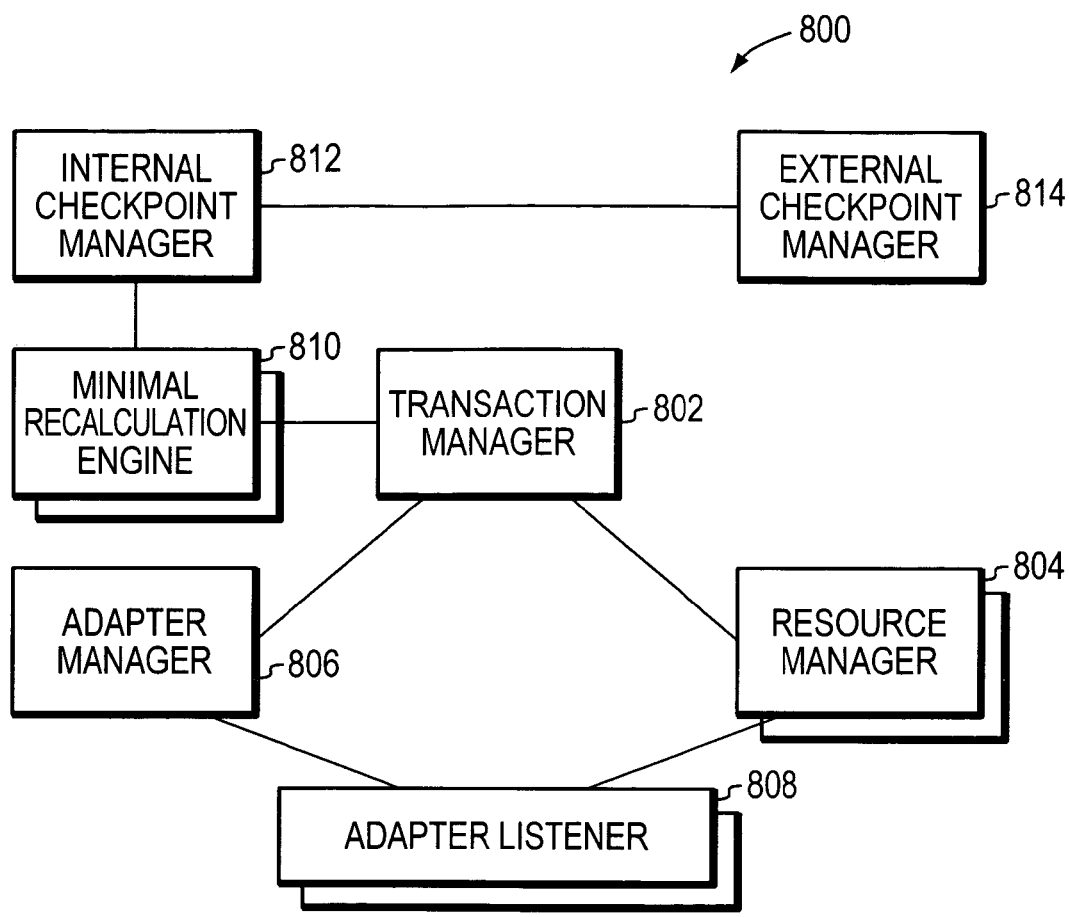
FIG. 8 shows an embodiment of the transaction processor module 116 of FIG. 1.

Referring to FIG. 8, the structure of an embodiment of a transaction processing subsystem in accordance with an embodiment of the present invention is described. Transaction processing subsystem 800 includes various processes including the transaction manager 802, which is generally the first of these processes to be started when transaction processing begins. Transaction manager 802 is responsible for starting all other required processes in transaction subsystem 800, for managing the state of transaction processing subsystem 800 (described below), and for assigning work to the individual processes of the transaction subsystem.

Adapter manager 806 receives information on transaction sources from transaction manager 802, and sets up an adapter listener 808 for each such source. When adapter listeners 808 are started, adapter manager 806 informs transaction manager 802 that the adapter listeners 808 are ready.

Each adapter listener 808 receives data from a queued transaction data source, such as Tibco, MQ Series, Tandem, Aleri IPC, or other data sources, databases, or systems that are capable of providing transaction information. Each adapter listener receives data from one or more of these sources, converts the data into the form that is used to represent transactions within transaction subsystem 800, forms blocks of the transaction data, and forwards the blocks of transaction data to a resource manager 804. In various embodiments, it is possible for a listener 808 to receive data from multiple sources, and for multiple listeners 808 to be use to receive data from multiple sources.

The size of the blocks of transaction data that are sent from an adapter listener 808 to a resource manager 804 can be an adjustable parameter that is "tuned" according to hardware and software configuration. An adapter listener 808 may collect transactions until a particular predetermined number of transactions are collected, and then send a block of transaction data to resource manager 804 and/or an adapter listener 808 may send all the transactions that are collected during a specified period of time. For example, an adapter listener could be set to send transactions when it has collected 200 transactions or when one second has elapsed since the last time that is sent a block of transactions, whichever occurs first.

Each resource manager 804 is responsible for collecting transactions and for logging collected transaction data for one source table of "transaction" type. Transaction manager 802 starts one resource manager 804 for each such transaction source table. Generally, each resource manager receives blocks of transactions from an adapter listener 808, synchronously stores the transactions to disk, and sends notification that the blocks have been stored to transaction manager 802, along with information on where the blocks of transactions can be retrieved for further processing. Once this information has been sent, resource manager 804 can continue its operation in a non-blocking manner.

Each minimal recalculation engine 810 is responsible for taking a set of transactions, typically in the form of edits to tables, and "running" at least a portion of a model on the edits. The transaction manager 802 may start one or more minimal recalculation engines 810 to run simultaneously. The number of minimal recalculation engines 810 that may be started at once typically is a configurable parameter of transaction manager 802. Transaction manager 802 manages these minimal recalculation engines 810 so that calculation of a model is parallelized at the table level. Each minimal recalculation engine 810 operates on indices and logs to recalculate portions of a model that are affected by the transactions, rather than recalculating the entire model. Each minimal recalculation engine 810 notifies the transaction manager 802 when it is finished with intermediate results, so that the transaction manager 802 may determine which portions of the model can be computed given the available sources, intermediate results, and system resources, and send those portions to one or more minimal recalculation engines 810.

Internal checkpoint manager 812 is responsible for the non-blocking two-phase auto-commit type check point functionality required by minimal recalculation engines 810. Typically, an internal checkpoint manager 812 and one or more slave processes are started by transaction manager 802 when transaction subsystem 800 is started.

External checkpoint manager 814 is responsible for publishing changes to selected targets, and to other applications and processes. Typically, one external checkpoint manager 814 is started by transaction manager 802 when transaction subsystem 800 is started.

System Operation

In operation, database transactions may result in the vertical partitioning of individual columns from the database 200 into vector data structures that are themselves stored as individual files in the database 200. These vectors may be further subdivided and farmed out to individual processors or workstations for processing. Vectorization facilitates parallel processing because typically the same operation will be performed on every data entry in the vector. Moreover, a vectorized or subdivided data set is more likely to fit in the high-speed cache memory of a processor, reducing the need for external memory accesses, and more likely to fit in the main memory of a computer system, reducing the need for disk accesses that can slow down processing.

Batch Processor Operation

Figure 9:
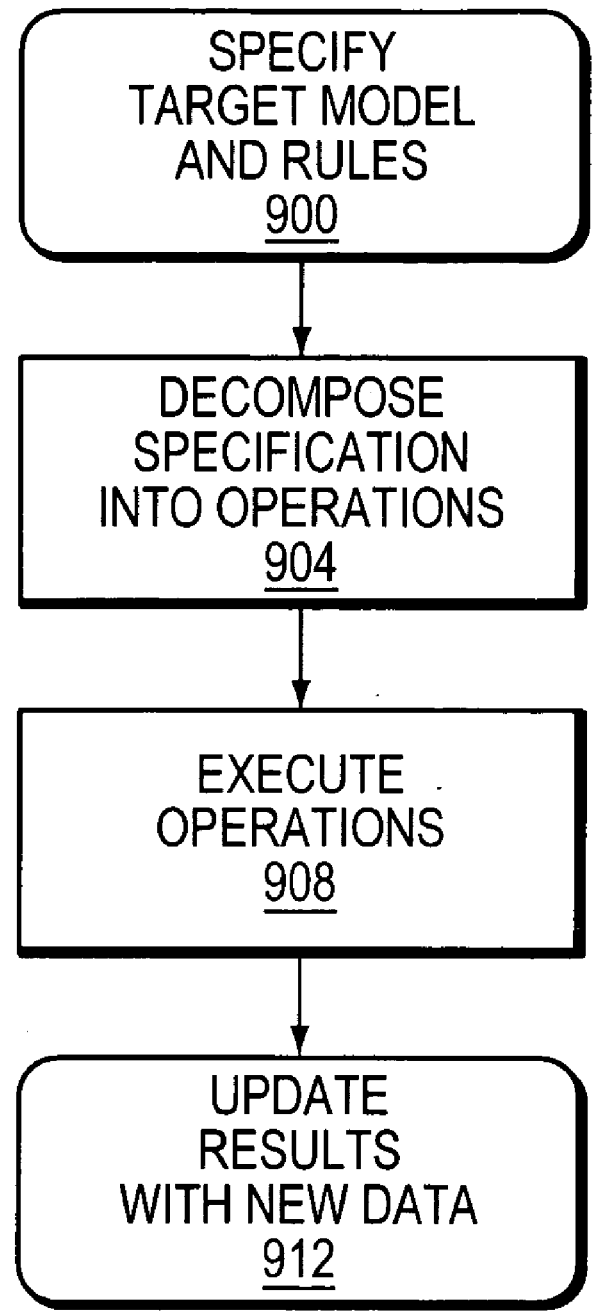
FIG. 9 is a flowchart illustrating an embodiment of a method for specifying a data model and a set of computational rules accompanying the model in accord with the present invention.

Referring to FIG. 9, using the System GUI, a traditional text-based interface, or other equivalent interfaces, a user may specify a data model and a set of computational rules accompanying the model (Step 900). The model sets out such elements as source tables, target tables, table keys, mappings between tables, and rules. The system uses this specification to construct a series of operations, e.g., joins and aggregations, that can be used to transform the input tables into the target model (Step 904). Having established the set of operations, the system executes them and provides the results to the user. In certain embodiments, the results are updated in real-time with the results of newly-processed transactions (Step 908).

The system associates every table with a unique table identifier, i.e., an index such as a numerical value, by automatically constructing an analyzing a graph structure. Similarly, each field in each table is associated with a unique field identifier, i.e., a second index.

The relations that serve as inputs are referred to as d-tables or deltas. A d-table typically includes one or more fields derived from an external source, such as a Sybase table, a text file, or a vectorized table native to the system. In some embodiments, one or more of the fields in the d-table may be computed fields.

Intermediary, derived tables are referred to as g-tables or gammas. The fields in a g-table are derived from the rules and one or more tables that the user has previously specified. The input tables I that form a particular g-table G, i.e., the set of relations I(G), are the tables whose fields are referenced in the computational rules which define G. For example, if G has one field which is computed from fields contained in tables E and F, then it is true that I(G)={E, F}. The combination of d-tables, g-tables, and tables derived from g-tables automatically define an internal graph structure.

Every table T has one or more key fields K(T) that uniquely identify the records in T. For example, assume a table of employees T1:

| SSN | Name | Department | Salary |
|---|---|---|---|
| 100-01-0000 | Bob | Sales | 100 |
| 020-02-9999 | Bob | Development | 200 |
| 007-87-1523 | Ken | Marketing | 150 |
| 976-81-1829 | Joan | Sales | 300 |
| 172-67-9163 | Brenda | Development | 80 |
| 658-17-8743 | Dennis | Development | 300 |

In this example, one possible K(T1) is the employee's social security number. Similarly, assuming that no person works for more than one department, a second possible K(T1) is the pair of columns (Name, Department). The database system maintains a key table in database 200 containing the keys for all of the tables used in the graph.

The input tables I(G) for a particular gamma are related by a mappings between the individual input tables. Referring to the employee table T1, assume a table T2 identifying the managers of the departments specified in T1:

| Department | Name |
|---|---|
| Sales | Joan |
| Development | Dennis | and a table identifying the locations of each department:

| Department | City |
|---|---|
| Sales | Paris |
| Development | Santa Fe |
| Research | Sausalito |

The user may define a mapping: Map(Employee.Department, Manager.Department). This indicates that the entries in these particular columns are drawn from the same set of data. The Map operator is reflexive, i.e., Map(Manager.Department, Employee.Department) is equivalent to Map(Employee.Department, Manager.Department). The Map operator is also transitive, in that defining another Map (Employee.Department, Location.Department) permits the system to infer that Map(Manager.Department, Location.Department). Formally speaking, a mapping M exists between two fields F and G if there is a path H[1], . . . , H[n] with F=H[1], H[n]=G, and either n=1 and F=G, or n>1 and for each i between 1 and (n−1), either Map(H[i], H[i+1]) or Map(H[i+1], H[i]) is a mapping declared by the user.

As mentioned above, the user may also specify computational rules to, e.g., create column entries in a gamma. For example, to derive a g-table T3 containing each employees' manager, a user may define Map(EmployeeManager.SSN, Employee.SSN), indicating that the entries in the SSN column in the EmployeeManager relation must be drawn from the entries in the SSN column of the Employee relation. Then, the user could specify computational rules, such as:

EmployeeManager.SSN :=Employee.SSN

EmployeeManager.Name :=Employee.Name

EmployeeManager.ManagerName :=Manager.Name

When these mappings and rules are compiled, the system attempts to use various types of table joins (e.g. Fuse, Link, and Loop joins, described below) to combine tables as necessary to enable the calculation of the specified rules. For example, the result of the example rules specified above would be:

| SSN | Name | ManagerName |
|---|---|---|
| 100-01-0000 | Bob | Joan |
| 020-02-9999 | Bob | Dennis |
| 007-87-1523 | Ken | <null> |
| 976-81-1829 | Joan | Joan |
| 172-67-9163 | Brenda | Dennis |
| 658-17-8743 | Dennis | Dennis |

The system stores a table map in database 200 that contains all of the mappings between all of the tables in the graph and has the structure:

| t | u | M(t,u) | M(u,t) |
|---|---|--------|--------|
| . | . | ------ | ------ |
| . | . | .      | .      |
| . | . | .      | .      |
| T | U | f,..., g | h,..., i |
| . | . | .      | .      |
| . | . | .      | .      |
| . | . | .      | .      |

Figure 10:
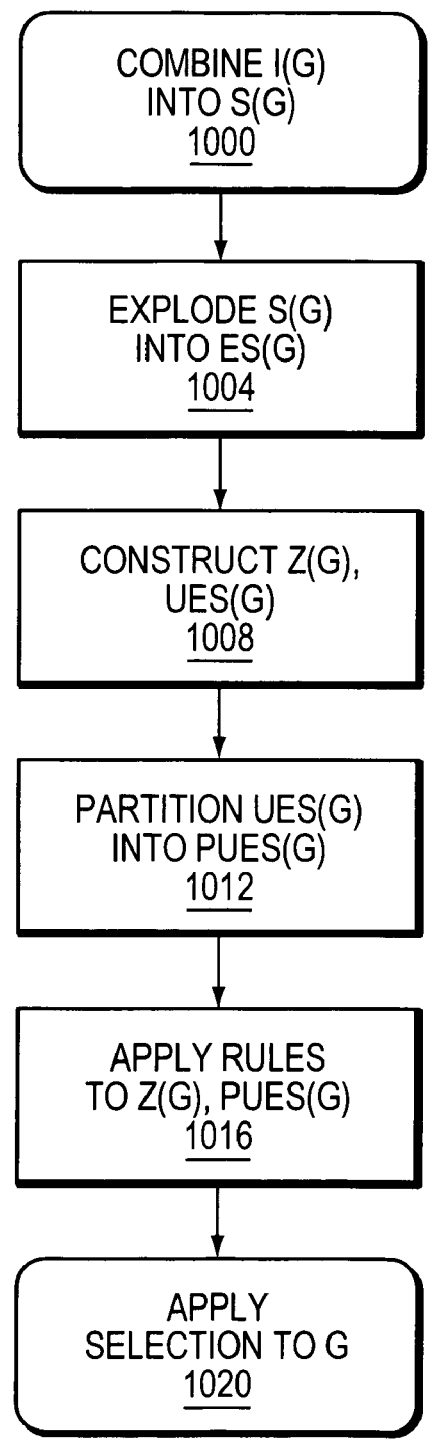
FIG. 10 is a flowchart depicting an embodiment of a method for processing a g-table in accord with the present invention.

Referring to FIG. 10, the processing of each g-table G occurs in six steps. First, all of the input tables I(G) are combined into a single table S(G) (Step 1000). Next, S(G) is exploded into a single table ES(G) (Step 1004). Duplicate fields in ES(G) are discarded to form table UES(G) and a synonym table Z(G) is constructed from ES(G) (Step 1008). UES(G) is partitioned into PUES(G) (Step 1012), and G is constructed by applying the computational rules to PUES(G) and Z(G) (Step 1016). Lastly, the selection proposition is applied to G (Step 1020).

Given the input tables I(G), the step of combining I(G) into S(G) (Step 1000) can be achieved by first applying fuse, link, and loop operations according to the algorithm described below.

Having completed the combination step (Step 1000), the resulting table S(G) contains all of the fields in the input tables I(G), which may result include one or more duplicate fields. Duplicate fields will be duplicated when the S(G) is Exploded (Step 1004), resulting in an exploded table ES(G) containing fields with identical values.

The Explode operator replicates the rows of a table to accommodate the rearrangement of the rows of a subset of the table fields into a single column. Typically, the Explode operator includes the following steps:

a. The columns on which explode is done get eliminated.
b. The rows get replicated as many times as the number of columns on which the explosion is done.
c. Two new Columns get added to the result: "Field Name", "Field Value". (The user may choose different column names).
d. The "Field Name" columns become the additional field of the key.

All the values in the columns on which the Explode is done are being put into the "Field Value" column so that the values in the "Field Value" columns correspond the respective column names in the "Field Name" column, based on which columns the values are taken from. (During this operation all the values, which go into the "Field Value" column get converted to character, if they are of different data type, otherwise the datatype is preserved). The following example illustrates the Explode operator (key fields are marked by "✗"):

| K1* | K2* | F1       | F2 | F3              | F4         |
|-----|-----|----------|----|-----------------|------------|
| A   | 1   | New York | 10 | 10th Avenue     | 555-55-55  |
| A   | 2   | Chicago  | 20 | Shore Drive     | 222-56-78  |
| A   | 3   | New York | 30 | 5th Avenue      | 555-12-12  |
| B   | 1   | Paris    | 10 | Place De La Concorde | 123-45-67 |
| B   | 2   | London   | 11 | Trafalgar Square | 999-99-99 |

-continued

| K1* | K2* | F1            | F2 | F3            | F4         |
|-----|-----|---------------|----|---------------|------------|
| B   | 3   | Moscow        | 12 | Red Square    | 444-44-44  |
| C   | 0   | St. Petersburg| 13 | Palace Square | 111-11-11  |

Assume that the table is exploded on the fields F2, F3, and F4, producing the following result:

| K1* | K1* | Field Name* | Field Vlaue          | F1              |
|-----|-----|-------------|----------------------|-----------------|
| A   | 1   | F2          | 10                   | New York        |
| A   | 1   | F3          | 10th Avenue          | New York        |
| A   | 1   | F4          | 555-55-55            | New York        |
| A   | 2   | F2          | 20                   | Chicago         |
| A   | 2   | F3          | Shore Drive          | Chicago         |
| A   | 2   | F4          | 222-56-78            | Chicago         |
| A   | 3   | F2          | 30                   | New York        |
| A   | 3   | F3          | 5th Avenue           | New York        |
| A   | 3   | F4          | 555-12-12            | New York        |
| B   | 1   | F2          | 10                   | Paris           |
| B   | 1   | F3          | Place De La Concorde | Paris           |
| B   | 1   | F4          | 123-45-67            | Paris           |
| B   | 2   | F2          | 11                   | London          |
| B   | 2   | F3          | Trafalgar Square     | London          |
| B   | 2   | F4          | 999-99-99            | London          |
| B   | 3   | F2          | 12                   | Moscow          |
| B   | 3   | F3          | Red Square           | Moscow          |
| B   | 3   | F4          | 444-44-44            | Moscow          |
| C   | 0   | F2          | 13                   | St. Petersburg  |
| C   | 0   | F3          | Palace Square        | St. Petersburg  |
| C   | 0   | F4          | 111-11-11            | St. Petersburg  |

The Implode operator is the opposite of the Explode operator. The same example above could be used to illustrate an Implode, except the source of Implode would be the second table. The Implode operator includes the following steps:

a. One key column is chosen as the fields names source.
b. One column is chosen as a fields values source.
c. As a result of elimination of the two columns, the remaining table should have rows duplicated, as many times as the number of unique values in the first column, otherwise implosion is impossible. Producing a set of distinct rows eliminates the duplication.
d. The new key is the previous key without column in (1).
e. As many columns as the number of distinct values in the column in (1) gets added to the result of (3), the names of the columns being the values of the column in (1).
f. The values of the columns are populated from the column in (2), so that the correspondence between the columns names and the values is the same as the correspondence between the values in the columns (1) and (2), row-wise, and the correspondence between the remaining key and the values in the column (2) is preserved.

The next step in the processing of the g-table is to construct a dictionary Z(G) and a reduced table UES(G) (Step 1008). Equivalence classes of fields are formed, for example, (f, . . . ,g), (h, . . . ,i), etc. The first field in the group—here f or h—is selected to represent all of the fields in the group. The remaining fields in each group are deleted from ES(G), leaving only the representative fields in the result table UES(G).

The dictionary Z(G) is constructed with variables whose names match the original fields of ES(G): Z.f:'f, . . . , Z.g:'f, Z.h:'h, . . . , Z.i:'h, etc. The value of Z.x is the name of the representative field of the group to which X belongs. The dictionary Z(G) improves performance by reducing the partitioning of multiple copies of the same data and is used for logical reasons to ensure that the name of every field in every input table I(G) is recognized as it appears in the rules for G.

After construction of the dictionary, the reduced table is partitioned (Step 1012) into relation PUES(G). Using the table map for I(G) and G, one can determine whether K(G) is also a key for UES(G). If K(G) is not a key for UES(G), we can select the partitioning to force K(G) to be a key for UES(G) by partitioning UES(G) on K(G), converting the remaining fields of UES(G) into lists of vectors.

The next step in table processing defines each field in G by evaluating the rule defining that field over PUES(G) (Step 1016). Since PUES(G) is a partitioned table, the execution of the rules results in aggregated fields, i.e., vector fields, and not fields which are lists of vectors. In one embodiment, if the execution of a rule results in an atomic value, then that value is reshaped to a vector with a length equal to the cardinality of G whose entries are the atomic value, repeated. In another embodiment, if the execution of a rule results in a value which is a list of vectors, then a run-time "depth" error is signalled. In yet another embodiment, this latter error is detected at compile time by a semantic analyzer contained in system GUI 308.

First, the rules for K(G) (the keys of G) are evaluated. If the resulting table contains empty records, then these empty records are removed from both G and PUES(G). Then the rules for the remaining tables are ordered based on dependency relations among the fields they define. For example, if a value G.gross is defined to be G.priceG.quantity, then G.quantity and G.price are defined before G.gross is computed. Dependency cycles in the rules are not allowed. Lastly, the selection proposition Y is applied to G (Step 1020), keeping only those records in G which satisfy Y. The result is saved in the database 200, with each file corresponding to an individual vector, and can be used as input to additional g-tables.

Figure 11:
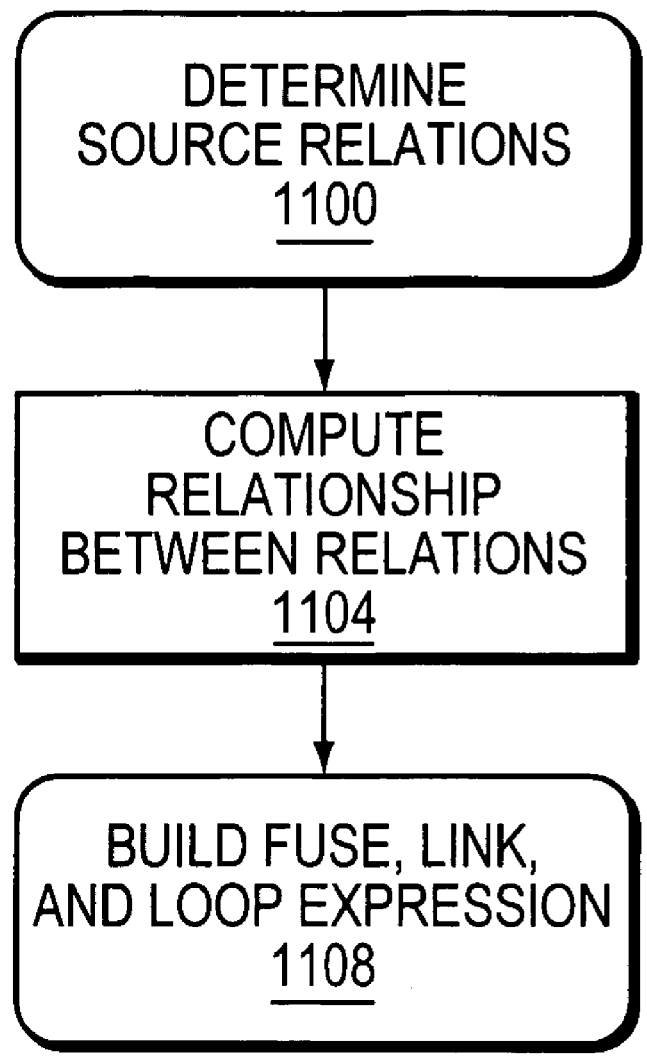
FIG. 11 is a flowchart showing an embodiment of a method for computing the expressions underlying a combined relation specified by a user in accord with the present invention.

FIG. 11 is a flowchart illustrating the algorithm for computing the underlying expressions representing the combined relation specified by the user. First, the source relations are determined (Step 1100). Next, a series of steps is determined for computing a relationship between tables (Step 1104). Lastly, an algorithm is iteratively applied to the source relations to build an expression using the fuse, link, and loop operators (Step 1108).

Given a table computed by rules, the source relations can be determined (Step 1100) by examining the rules and identifying all of columns used by the rules. For example, in a rule using the dotted identifier Employee.SSN the column is "SSN" and "Employee" is the relation. More precisely, suppose the rules for a particular derived relation T have the form:

$T.f1 := <\text{expression } 1>$ $T.fn := <\text{expression } n>$ and the fields occurring in <expression 1>, ..., <expression n> are S1.g1, ..., Sm.gm. Then, the collection of source relations is the set of distinct identifiers in the collection S1, ..., Sm.

Having identified the source relations, it is now possible to deduce, for any pair of relations, one of four possible relationships: "1to1", "1toM", "Mto1", and "MtoM" denoting, respectively, one-to-one, one-to-many, many-to-one, and many-to-many relationships (Step 1104). First a collection of sets is initialized. Given the complete set of mappings between all relations (not only source relations):

$M=\{\text{Map } (s1,f1, t1.g1), \ldots, \text{Map}(sn,fn, tn.gn)\}$

It is possible to identify the set of sets of column E using the following algorithm. First, initialize E to be the set {{s.f} |s.f is a column in one of the tables}. Thus, E is a set of singleton sets, each having one field. Also, set N to M.

Next, assume that the first element in N is Map(e1, e2), where e1 and e2 are columns. Then, let K1 be the element of E such that e1 is an element of K1; and K2 be the element of E such that e2 is an element of K2. Set E=E-{K1, K2} union {K1 union K2} and N=N-{Map(e1, e2)}. Afterwards, if N is empty, then stop the process. Otherwise, process the next element in N.

As an example, consider the previously-defined Employee, Manager, and Location relations with the mappings:

Map (Employee. Department, Manager. Department)
Map (Manager. Department, Location. Department)

To calculate the collection E of sets, E is initialized to:
E={{Employee.SSN}, {Employee.Name}, {Employee.Department}, {Employee.Salary}, {Manager.Department}, {Manager.Name}, {Location.Department}, {Location.City}}

In light of the first Map, E becomes:
E={{Employee.SSN}, {Employee.Name}, {Employee.Department, Manager.Department}, {Employee.Salary}, {Manager.Name}, {Location.Department}, {Location.City}} and after the second Map, E becomes
E={{Employee.SSN}, {Employee.Name}, {Employee.Department, Manager.Department, Location.Department}, {Employee.Salary}, {Manager.Name}, {Location.City}}

Thus, the algorithm forces Employee.Department and Location.Department to be related because they end up in the same set or equivalence class.

A fuse is a one-to-one join, also called a "full outer join" in relational databases. The operation in expressions is "Fuse". For instance, the expression:

Fuse (Manager, Location)

represents the full outer join of the Manager and Location relations, where the join is based on the key columns Manager.Department and Location.Department. Given the data above, this relation is:

| Department | Name | City |
| --- | --- | --- |
| Sales | Joan | Paris |
| Development | Dennis | Santa Fe |
| Research | <null> | Sausalito |

There may be more than two relations in a Fuse. The key field of a Fuse is the key field of any of the relations; by convention, we set it to be the key field of the last relation in the Fuse expression. Thus, the key field for the Fuse above is the Location.Department column.

A link is a one-to-many join. The operation in expressions is "Link". There may be more than one relation that is linked "one" to the "many" relation. The "many" relation is called the driver relation, and appears last in the Link expression. For instance, in the expression:

Link (Manager, Employee)

the driver relation is Employee, which is in a many-to-one relation with Manager (each row in Manager matches possibly many rows in Employee, using the key columns). The relation computed by this link is, given the above data:

| SSN | Name | Salary | Manager.Name |
|---|---|---|---|
| 100-01-0000 | Bob | 100 | Joan |
| 020-02-9999 | Bob | 200 | Dennis |
| 007-87-1523 | Ken | 150 | <null> |
| 976-81-1829 | Joan | 300 | Joan |
| 172-67-9163 | Brenda | 80 | Dennis |
| 658-17-8743 | Dennis | 300 | Dennis |

Similarly, the expression:

Link (Manager, Location, Employee)

specifies Employee as the driver relation, and returns a relation with one more column (the City column). Another similar expression is:

Link (Fuse (Manager, Location), Employee)

where again Employee is the driver relation. The key field of a Link is the key field of the driver relation.

Finally, a loop is a many-to-many join. The operation in expressions is "Loop". Loop expressions involve only two relations, e.g., Loop (Relation1, Relation2 ). The key field of a Loop is the union of the key fields of the two constituent relations, with duplicate mapped keys removed from this set.

The subroutine for deducing the relationship between S and R, for any relations S and R, uses this set E={E[1], . . . , E[m]} using the following steps. First, the key fields of S and R are identified. For example, assume that they are either declared or computed to be S.a1, . . . , S.am and R.1, . . . , R.bp. Using these key fields, determine the sets K and L such that:

$K=\{u | \text{if } S.Bv \text{ is in } E[u] \text{ for some } v \text{ and } u, \text{ then some column of } R \text{ is also in } E[u]\}$ $L=\{u | \text{if } R.bv \text{ is in } E[u] \text{ for some } v \text{ and } u, \text{ then some column of } S \text{ is also in } E[u]\}$ After this computation, if K=L, then the relation between the source relations is "1to1," i.e., a one-to-one relationship. If L is a proper subset of K, then the relation is a "1toM", i.e., a one-to-many, relationship. If K is a proper subset of L, then the relation is a "Mto1", i.e., a many-to-one relationship. If K and L are incomparable as sets, then the relation is a "MtoM", i.e., a many-to-many relationship.

Again, for example, consider the set E constructed above and assume that it is desirable to deduce the relationship between the relations Employee and Manager. The key field of Employee is Employee.SSN and the key field of Manager is Manager.Department. Following the process outlined above, Employee.SSN is in the first set of E and Manager.Department is in the third set of E. Thus K={} and L={3} and K is a proper subset of L, so there is a "Mto1" relationship between Employee and Manager.

For another example, assume that it is desired to deduce the relationship between Manager and Location. The key fields are Manager.Department and Location.Department. Thus, K={3} and L={3}, so there is a "1to 1 " relationship between Manager and Location.

Figure 12:
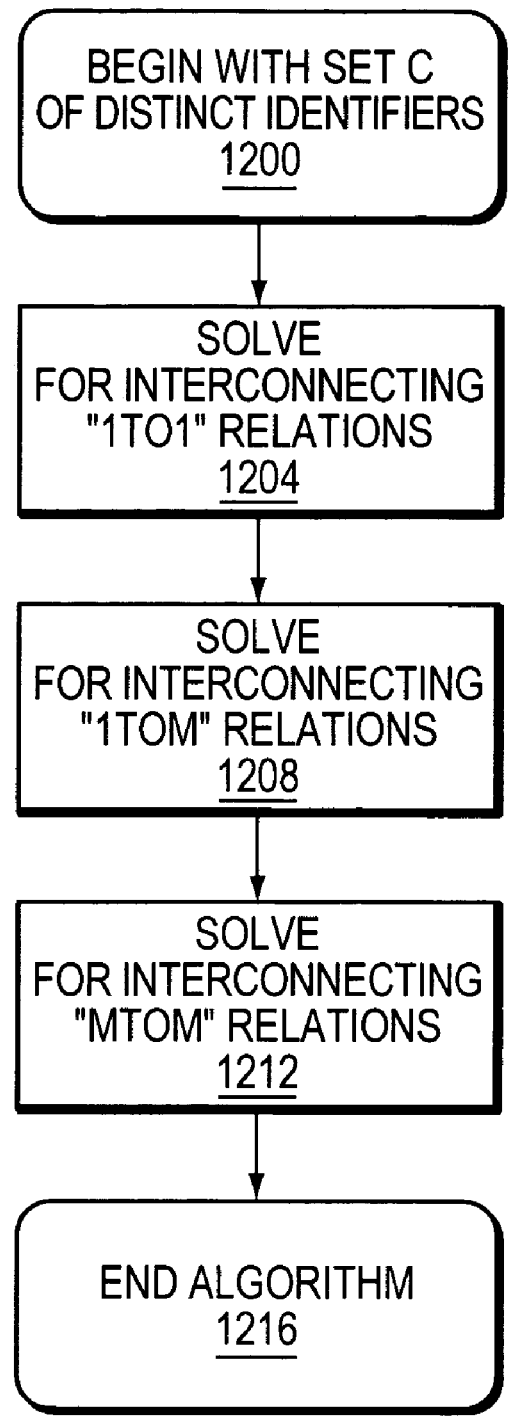
FIG. 12 is a flowchart illustrating an embodiment of an iterative algorithm for transforming source relations into an expression using the fuse, link, and loop operators.

Once the relations are deduced (Step 1104), an iterative algorithm is applied to the source relations to build an expression using the fuse, link, and loop operators (Step 1108). The algorithm is illustrated in FIG. 12 and begins with a set C={S1, . . . , Sm} of distinct identifiers (Step 1200). Without loss of generality, the identifiers can be assumed to be distinct since they are contained in a set.

First, assuming that C={T1, . . . , Tk}, then set D=C and E to be the empty set. Defining the first element in D to be V, then solve for all relations in D-{V} that are "1to1" related to V, using the algorithm in Step 1104 (Step 1204). If there are no such relations, set E=E union {V} and D=D-{V}. Assuming that there are "1to1" relations U1, . . . , Ur, then set E=E union {Fuse(U1, . . . , Ur, V)} and D=D-{U1, . . . , Ur, V}. If D is not the empty set, solve for the "1to1" relations for the next entry in D, otherwise set C to E, and proceed to the next step.

Again assuming that C={T1, . . . , Tk}, then set D=C and E to the empty set. Define the first element in D to be V. Now, find all relations in D-{V} that are "1toM" related to V, using the algorithm of Step 1104 (Step 1208). If there are no such relations, set E=E union {V} and D=D-{V}. For each "1toM" relationship U1, . . . , Ur, set D= D-{U1, . . . , Ur, V} union {Link(U1, . . . , Ur, V)} union E and E to the empty set. If D is not the empty set, then solve for the "1toM" relations for the next element in V, otherwise set C to E and proceed to the next step.

Again assuming that C={T1, . . . , Tk}, then set D=C and E to the empty set. Define the first element in D to be V. Now, find all relations in D-{V} that are "MtoM" related to V, using the algorithm of Step 1104 (Step 1212). If there are no such relations, set E=E union {V} and D=D-{V}. For each "MtoM" relationship U1, . . . , Ur, set D=D-{U, V} union {Loop(U, V)} union E and E to the empty set. If D is not the empty set, then solve for the "MtoM" relations for the next element in V, otherwise set C to E and proceed to the next step.

If, after solving for the "1to1", "1toM", and "MtoM" relations, the set C has not changed or has only one entry, then stop, otherwise the algorithm repeats (Step 1216). If at the end C has more than one element, an error of "not enough mappings" is returned as the result; otherwise, the one element of C is returned.

Other embodiments of this algorithm detect anomalous or erroneous situations. For example, in one embodiment if the user defines a Map between a non-key in one relation and a non-key in another relation, an "exaggerated mapping error" is reported. In another embodiment, if the relationship between the combined relation and the target relation is "MtoM" or "1toM", as computed using the algorithm in Step 1104, then an error is reported. In still another embodiment, if the relationship between the combined relation and the target relation is "Mto1", then the Modeler sets the aggregation flag for the target relation. Also, if any of the rules for the key columns in the target relation are not simple field expressions-that is, the rules do not have the form $$t.f = s.g$$

where t is the target relation, f is the column in the target relation, s is the source relation, and g is the column in the source relation, the Modeler sets the aggregation flag for the target relation. This kind of rule is called a "key transformation."

The aggregation flag implies further checking. If the aggregation flag is set, the computational rules for the target relation are checked. These rules must have enough "aggregation" on non-key fields in order to ensure that the target relation can be constructed.

Operation of Transaction Processing

The rules just described can be used throughout the system, and are particularly useful in enabling transaction processing. By predetermining the relationships between the tables desired for use in queries, for example, the transaction processing subsystem can calculate the table changes required by transactions as transactions come into the system, even if the changes are to be reflected in the arbitrarily complex table relationships. This is demonstrated by the operation of transaction processing.

During transaction processing, a series of transactions affect the source tables (also called d-tables or delta tables), making changes to the data in those tables. When propagated through the model, these changes to the source tables may cause changes in the target tables. The database system of the present invention is capable of quickly handling most transactions, so that analysis based on a combination of historical data combined with incoming transactions is possible.

As discussed hereinabove, in operation, one or more adapter listeners 808 receive incoming transactions from a variety of sources. These transactions are collected into batches, and sent on to a resource manager 804, which stores the batches of transactions, and sends the batches of transactions on to transaction manager 802.

Transaction manager 802 implements a state machine that keeps track of the batches of transactions that are received, groups the batches of transactions for processing, and sends the batches of transactions to one or more minimal recalculation engines 810 for processing. The status of the processing of batches of transactions is tracked, so transaction manager 802 can determine when to send further batches of transactions to minimal recalculation engine(s) 810, and so that transaction processing can be resumed if an interruption occurs.

Figure 13A:
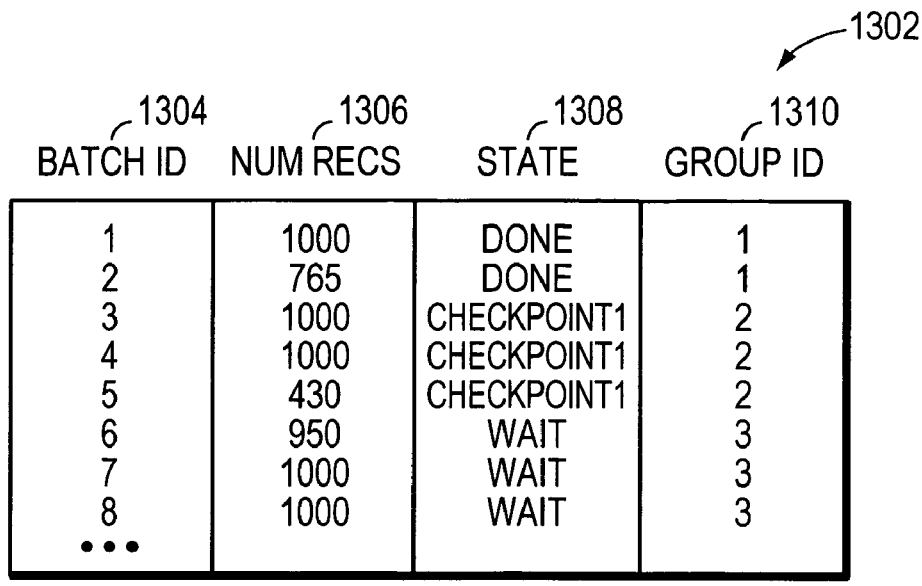
FIGS. 13A-B show an example of the state information that is maintained by transaction manager 802 of FIG. 8.
Figure 13B:
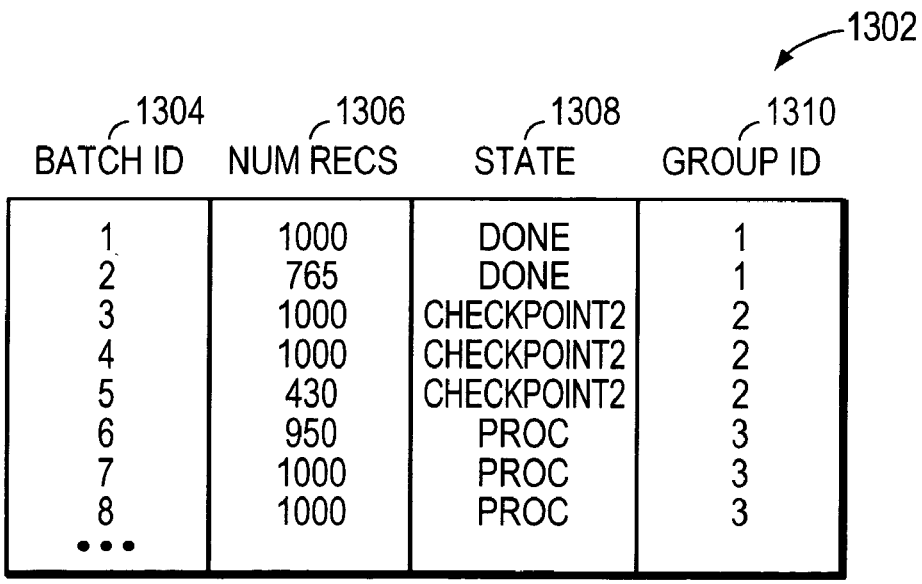

Referring now to FIGS. 13A-13B, an example of the state information kept by transaction manager 802 is described. Each row in state table 1302 includes a batch ID field 1304, that contains a unique batch ID of each batch of transactions to be processed, a NumRecs field 1306, that contains the number of transaction records contained in a particular batch of transactions, a state field 1308, that keeps track of the state of each batch of transactions, and a group ID field 1310, that keeps track of which group of batches of transactions are to be processed at once. In addition to these fields one embodiment of the present invention includes timing fields (not shown) with the state information. The timing fields may include fields for each group of batches of transactions that track the amount elapsed time since the group was formed, the amount of time spent calculating, and the amount of time spent checkpointing. This timing information may optionally be used for fine-grain tuning of the system, and for optimization heuristics on directed graphs.

An entry in state field 1308 may contain the value "done", which indicates that the batch of transactions has been processed, "proc", which indicates that the batch of transactions is being processed, "wait", which indicates that the batch of transactions is waiting to be processed, "checkpoint1", which indicates that the batch of transactions is in a phase of checkpointing in which a rename operation is occurring, or "checkpoint2", which indicates that the batch of transactions is in a non-blocking phase of checkpointing, in which logs are applied to a backup or "shadow" copy of the tables and indices.

The checkpointing will be described in detail hereinbelow, with reference to FIG. 25. During the phase of checkpointing during which the rename operation is being performed ("checkpoint"), the minimal recalculation engine(s) 810 are unable to start processing a new group of batches of transactions. When a group of batches of transactions reaches the "checkpoint2" state, the minimal recalculation engine(s) 810 can start processing a new group of batches of transactions.

In the example state table shown in FIG. 13A, the transaction batches with IDs 1 and 2 are "done", the transactions batches with IDs 3, 4 and 5 are in the "checkpoint1" state, and the transaction batches with IDs 6, 7 and 8 are waiting to be processed. This state information is used by transaction manager 802 during its operation, and may assist in recovering the state of transaction manager 802 if transaction processing is interrupted.

The entries in group ID field 1310 are used by transaction processor 802 to identify groups of batches to be processed at once. In this example, because the group ID is 2 for the batches of transactions with batch IDs 3, 4, and 5, these batches of transactions were sent to a minimal recalculation engine 810 as one large group of transactions.

In FIG. 13B, state table 1302 is shown a short time later. Now, the transactions batches with IDs 3, 4 and 5 are in the "checkpoint2" state, which is non-blocking. This permits transaction manager 802 to assign minimal recalculation engine(s) 810 to process the next group of batches of transactions. Accordingly, the batches with batch IDs 6, 7 and 8, all of which are processed as a group (with group ID 3), are now being processed, and have value of "proc" in state field 1308.

Figure 14:
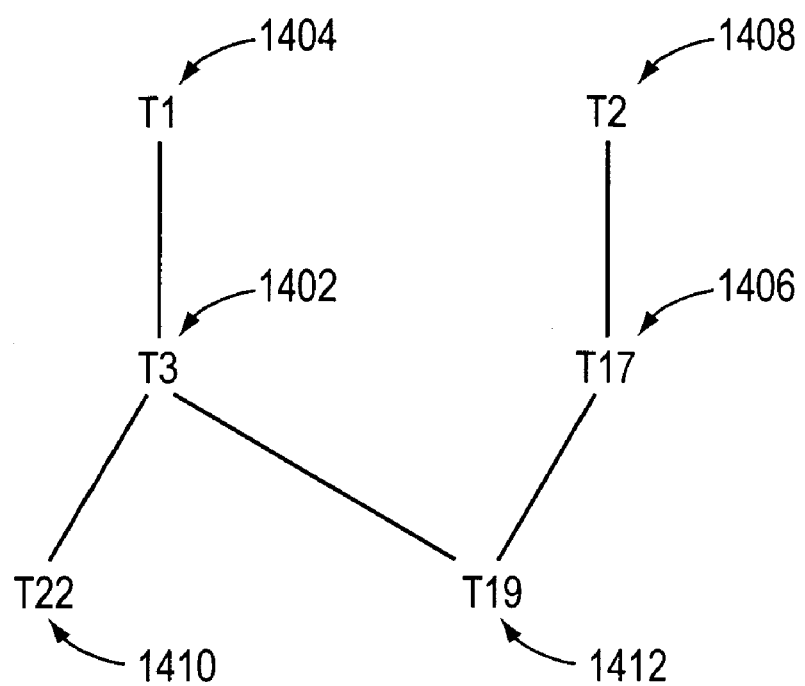
FIG. 14 is an example showing dependencies between tables.

Referring to FIG. 14, an example dependency graph of tables is shown. It will be understood that this example graph is an illustrative example, and that the actual dependency graphs handled by the system generally are more complex.

In the example, table T3 1402 is dependent on table T1 1404. Table T17 1406 is dependent on table T2 1408. Table T22 1410 is dependent on table T3 1402, and T19 1412 is dependent on tables T3 1402 and T17 1406. Due to these dependencies, transaction manager 802 can assign minimal recalculation engines to work on transactions affecting tables T1 1404 and T2 1408 in parallel, since neither depends on the other. No other tables may be computed until at least one of these tables has finished, even if more than two minimal recalculation engines 810 are available.

Once T1 1404 is finished, T3 1402 can be started in parallel with other minimal recalculation tasks that are being handled. T19 1412 cannot be started until both T3 1402 and T17 1406 have completed. If there are more tables ready to be processed than there are minimal recalculation engines 810 available to process them, the tables that are ready may be assigned arbitrarily to minimal recalculation engines 810. Alternatively, techniques such as use of weighted graphs can be used to place an order on the assignment of tables that are ready to minimal recalculation engines 810, to provide greater throughput.

The dependencies which are used to order and parallelize computation are available in the metadata, and are based on the mappings that were submitted by the user. Such parallelization, based on the availability of needed data (i.e. data flow) is also possible at the field level.

When the changes to a target table have been determined by minimal recalculation engine(s) 810, those changes may be applied in a non-blocking manner by internal checkpoint manager 812, and published to applications that "subscribe" to the target tables by external checkpoint manager 814.

Operation of the Minimal Recalculation Engine

Minimal recalculation engine 810 handles recalculation of target tables that are specified in the model when transactions change the source tables on which the target tables depend. The minimal recalculation engine makes use of the table rules that determine the manner in which source tables are joined to produce target table, and the application of field rules that compute the values of fields based on the values of other fields.

As described above, relations between tables can be one-to-one, one-to-many, or many-to-many. Each of these relations may be represented by creating a combined table from tables in which the related fields are located. The operation used in a table rule to combine tables depends on the nature of the relation. For example, for a one-to-one relation, a fuse operation (also called a full outer join) is used to combine tables. For a one-to-many relation, a link operation (also called a left or right outer join) is used, while for a many-to-many relation a loop operation is used.

The combined table discussed above could be virtual (i.e., represented through sets of indices showing which row in each table involved in a table rule contributes to which row of the combined table). There is one index per table, the length of which is the number of rows in the combined table. Each entry in the index corresponds to a row of the combined table, and contains the number of the row of the table it represents that contributed to that row of the combined table. Alternatively, if the memory model permits, the combined table may be physically produced.

As transactions enter the system, the transactions will affect the values in tables, which in turn, will affect the values in, and possibly the dimensions of, other tables that are defined in the model to depend from the modified tables, for example as the result of fuse, link, and loop operations or other functions. The tables that are subject to these operations may be very large. In addition, models of even moderate complexity may involve application of table rules that call for numerous fuse, link, and loop operations to be applied to join the various source tables into a target table. If each transaction that alters a source table resulted in complete recalculation of all tables that are defined in the model to depend on tables modified by the transaction, it would not be possible to handle transactions very quickly. To provide the rapid updates that are required for decision support based on incoming transactions, it may be necessary, for example, to handle hundreds or thousands of transactions per second.

Minimal recalculation engine 810, performs only a relatively small number of calculations for each received transaction. Minimal recalculation engine 810 uses indices, and logs of changes to the indices to propagate transaction changes made to a "source" table using a complex table rule in a model without performing a complete recalculation. For each transaction that changes a source table, a relatively small number of changes may be needed to indices that represent combined tables resulting from fuse, link, and loop operations called for in the model. Minimal recalculation engine 810 computes the changes to the indices and to the combined table (rather than recomputing the entire tables), and creates logs of these changes, which may be applied (asynchronously) by the checkpoint managers 812 of transaction processing subsystem 800.

As is shown in the following examples, the fuse, link, and loop operations of minimal recalculation engine 810 create logs of changes to indices that represent the combined tables, rather than recreating the actual combined tables. This reduces the required computation, since it is more efficient to add an entry to a log of an index than to build an entire table, particularly when the tables contain a large number (e.g. millions) of entries. In addition, since application of a rule in a model may not require the entire combined table in order to generate the changes to its target that result from a transaction changing a source table, the minimal recalculation engine can use only the necessary portions of a source or combined table that are needed to compute changes to target tables.

In the following examples, transactions will generally be referred to as "edits" to a source table. The edits are found in a log for the source table, and can indicate that inserts, updates, or deletes should be applied to the source table. As described above, in one embodiment, the edits are reviewed by a listener and provided to the minimal recalculation engine 810 by the resource manager 804. In general, an edit comprises an operation (e.g. insert, update, or delete), an index, which indicates the position (counting from 0) in the table or index at which the edit is applied, and zero or more data fields, indicating the data that is to be inserted or updated at the position indicated by the index. An insert edit (denoted with an "i" in logs shown in examples) indicates that an item should be inserted into a table at a position specified by the index. An update edit (denoted with a "u" in the logs shown in the examples) indicates that one or more values of the data fields of a row indicated by the index are to be changed. A delete edit (denoted with a "d" in the logs shown in the examples) indicates that the row specified in the index is to be deleted. In response to these edits to a source table, minimal recalculation engine 810 generates edits to the indices associated with the source tables, and the combined tables.

In one embodiment, delete edits are transformed into update edits. A "physical" delete, that actually removes the row from the table, is transformed into two updates. The first update moves the data fields of the last row of the table to the position of the row that is being deleted. The second edit changes the data fields of the last row of the table to "null" values. Such null rows can easily be truncated from the end of the table. This approach to deleting rows ensures that null rows from deletes accumulate at the bottoms of all the tables and indices, permitting a very inexpensive truncation operation to be used to remove the null entries at the ends of the tables. Moving the last row of the table into the position of the deleted entry prevents the system from having to perform the potentially expensive operation of moving all rows below the deleted entry up by one row.

A second type of delete, referred to as a "logical" delete may also be used. A "logical" delete is transformed into a single update, that changes the values all of the non-key fields of the deleted row to "null". Thus, using a "logical" delete, the deleted row remains in the table, but its non-key data are removed. Alternatively, a "logical" delete may be handled by the system as if it were an update that changes the values of all non-key fields in the row to "null", without actually transforming the operation into an update.

In one embodiment of the database system, the type of delete that is used is an adjustable parameter, permitting users to specify whether deletes are to be handled as "physical" deletes or as "logical" deletes.

The order in which edits are processed may also vary. In one embodiment of the system, edits have different priorities. For example, deletes could be given the highest priority, so all deletes are handled first. Updates have the second highest priority, so all updates are handled next. Inserts have the lowest priority, so they are handled last. These priorities may vary, and may be specified in the metadata. If the metadata does not specify priorities, then all operations may be given equal priority, so that edits will be handled in the order that they are received.

In an embodiment that uses such priorities, edits can be handled differently, or even ignored based on their priority, and on the other edits that are in a log. The following procedure may optionally be applied to handle prioritized edits. Note that this procedure assumes that delete edits are handled as "logical" deletes, and are directly processed by the system, rather than first being transformed. First, a search is performed for each new edit, based on its key. If the edit is not found in the table, the edit is transformed into an insert. Note that this generally only affects updates for which a key is not found. If the key is found, the priority for the edit is compared to the priority of the match that was found (assuming that the match was found in the logs). If the priority is greater than or equal to the match, then the edit is applied without a change (though a "duplicate key" warning may be issued in the case of insert and delete edits). If the priority of the edit is less than the priority of the matched element, then the edit is ignored.

This optional procedure may be useful in cases where the order of edits received by the system is not the same as the order in which the transactions occurred. By using priorities in conjunction with the procedure provided above, a reasonable order may be given to the edits, and edits that will have no effect (e.g., because the row they modify has been deleted) may be ignored. This priority-based handling of edits may optionally be performed early in the process of handling transactions, such as in an adapter listener 808, resource manager 804, or in other processes in transaction handling subsystem 100.

The following examples demonstrate how edits coming into the system as a result of transactions are propagated through the operations that form table rules (i.e. the fuse, link, and loop operations). In accordance with the present invention, applying an edit to a source table that is transformed by a join operation (i.e. a fuse, link, or loop) causes a set of zero or more edits to be added to logs associated with the indices that represent a combined table that results from such a join operation, and to a log associated with the combined table.

Referring to FIGS. 15A-15C, an example of a fuse operation with updates due to transactions in accordance with the present invention is described. FIG. 15A shows the starting state of tables T1 (1500) and T2 (1502), and of combined table TC (1504), which is the result of applying a fuse operation to T1 (1500) and T2 (1502). It should be noted that table TC (1504) is shown here for illustrative purposes only, and need not actually be constructed, due to the use of T1 INDEX (1506) and T2 INDEX (1508), which represent the combined table TC (1504). TC (1504) is a "virtual" table, in the sense that it does not actually exist in memory.

All of table T1 (1500), table T2 (1502), index T1 INDEX (1506), and index T2 INDEX (1508) as shown in FIG. 15A typically would have been generated during batch processing or other initialization stages, and would already exist at the time that transaction processing begins. Use of minimal recalculation engine 810 permits application of relationships specified in a model to perform analysis of historical data, such as is shown in FIG. 15A, in combination with incoming transaction data, as will be described below.

As can be seen in FIG. 15A, the fuse operation takes two tables (in this case, T1 (1500) and T2 (1502), which are mapped one-to-one on a key field in each table (in this case, key field K1 (1510) in T1 (1500) and key field K2 (1512) in T2 (1502)), and creates a single table whose fields are the union of the fields of the two tables (in this case, combined table TC (1504)). As mentioned, the combined table TC can be virtual, and exist only in the form of the indices T1 INDEX 1506 and T2 INDEX 1508. These indices that represent the combined tables indicate which rows from the source tables map to the rows of the combined table. For example, T1 INDEX (1506) contains {0 1 2 - - }. This indicates that row 0 (counting from 0) of the combined table TC (1504) contains values from the fields of row 0 of T1 (1500), row 1 of the combined table contains values from the fields of row 1 of T1, row 2 of the combined table contains values from the fields of row 2 of the combined table, row 3 of the combined table does not correspond to a row in T1, and row 4 of the combined table does not correspond to a row in the combined table. Similarly, T2 INDEX (1508), which contains {0 - - 2 1 3}, indicates that row 0 of the combined table TC (1504) contains values from the fields of row 0 of T2, row 1 of the combined table does not correspond to a row of T2 (since T2 does not contain the key "B"), row 2 of the combined table contains values from the fields of row 2 of T2, row 3 of the combined table contains values from the fields of row 1 of T2, and row 4 of the combined table contains values from the fields of row 3 of T2.

Referring now to FIG. 15B, the results of performing a transaction that affects one of the source tables of the fuse operation are described. In FIG. 15B, an example transaction 1520 calls for an insert, which is a new row to be inserted into table T1 (1500). This insert is represented by an entry 1520 in T1-LOG 1522. Entry 1520 is an edit having an operation-type "i", for insert, index 3, indicating that the item is to be inserted as row 3 of table T1 (i.e. after the current last row, counting from 0), a key value K1 of "D", and other values associated with table T1, as listed in entry 1520.

Insertion of a new record (or row) into T1 will affect the combined table formed by the fused combination of T1 and T2. Therefore, to process the edit in T1-LOG 1522, minimal recalculation engine 810 will generate T1 INDEX-LOG 1524, to contain edits to T1 INDEX 1506, T2 INDEX-LOG 1526, to contain edits to T2 INDEX 1508, and COMBINED LOG 1528, to contain edits to the combined table TC 1504.

Since the key K1 in entry 1520 is "D", which is not already present in table T2 1502, insertion of entry 1520 into T1 1500 will cause the addition of a new row in the combined table, which means that insertion of entry 1520 requires insertion of a new row into both T1 INDEX 1506 and T2 INDEX 1508. Minimal recalculation engine 810 determines the required inserts to the indices, and adds them to T1 INDEX-LOG 1524, and T2 INDEX LOG 1526, respectively. As can be seen, in this example, an insert edit at row 5 with a value 3 is added to T1 INDEX-LOG 1524, indicating that T1 INDEX 1506 should have a 3 inserted in (new) row 5 (i.e. row 5 of the combined table takes values from row 3 of T1). An insert edit at row 5 of null ("-") is added to T2 INDEX-LOG 1526 (i.e. row 5 of the combined table does not correspond to a row of T2, since T2 does not contain the key "D"). Minimal recalculation engine 810 also generates an entry in COMBINED LOG 1528, indicating that a new row 5 should be inserted, with values as shown.

Although combined table TC 1504 does not actually exist in memory, being represented by T1 INDEX 1506 and T2 INDEX 1508, since relatively few operations are required to generate the entry in COMBINED LOG 1528, as an optimization, COMBINED LOG 1528 is actually generated, even though it could be generated from T1 LOG 1522, T1 INDEX-LOG 1524, and T2-INDEX LOG 1526. Additionally, it should be noted that in actual operation, the edits in the combined table log will typically contain only the operation and index, until an entire table rule (which may include numerous fuse, link, and loop operations) is applied, after which the data fields will be added to the final combined log. The data fields are shown here for illustrative purposes.

In general, an insert of a row that has a completely new key (i.e. a key that is new across all the tables that are being fused), such as is shown in the example of FIG. 15B, causes inserts to be added to each of the table index logs, and an insert to be added to the combined table log. An insert of a row having a key that is present in one of the other tables that is being fused causes an update to be added to the index log of the table being edited, and an update to be added to the combined table log.

Referring now to FIG. 15C, a different transaction that causes changes to the original data shown in FIG. 15A is described. In FIG. 15C, entry 1540 of T1-LOG 1542 indicates that row 1 (counting from 0) of T1 1500 should be updated to change the value of F2. This edit will not require any change to T1 INDEX 1506 or T2 INDEX 1508, since the keys are not altered. The only change that must propagate through the fuse operation is an update to the data in the combined table to reflect the change in the data in table T1 1500. Therefore, minimal recalculation engine 810 need only add an entry to COMBINED LOG 1544 updating the values in the appropriate row of the combined table.

In general, an update of a non-key in any table that is being fused will cause an update to be added to the combined table log. Updates to the keys of tables that are being fused are not allowed, except when they are caused by a delete, as described below.

Deletion of a row from one of the source tables of a fuse operation may be accomplished using, for example, a "physical" delete, in which the delete is handled by transforming the delete edit into two undate edits. The first update moves the data from the last row of the table in which a delete is occurring to the row that is being deleted. The second update changes the last row of the table to contain all "null" values. Such null entries of the table may be truncated from the end of the table.

Note that an update to a key occurs as a result of transforming the delete into two edits. As described above, such an update would not normally be permitted. An exception is made in the case of an update resulting from a delete edit. Generally, an update to a key in a fuse operation resulting from a delete will require updates to the indices of the tables being fused, and to the combined log.

Figure 16A:
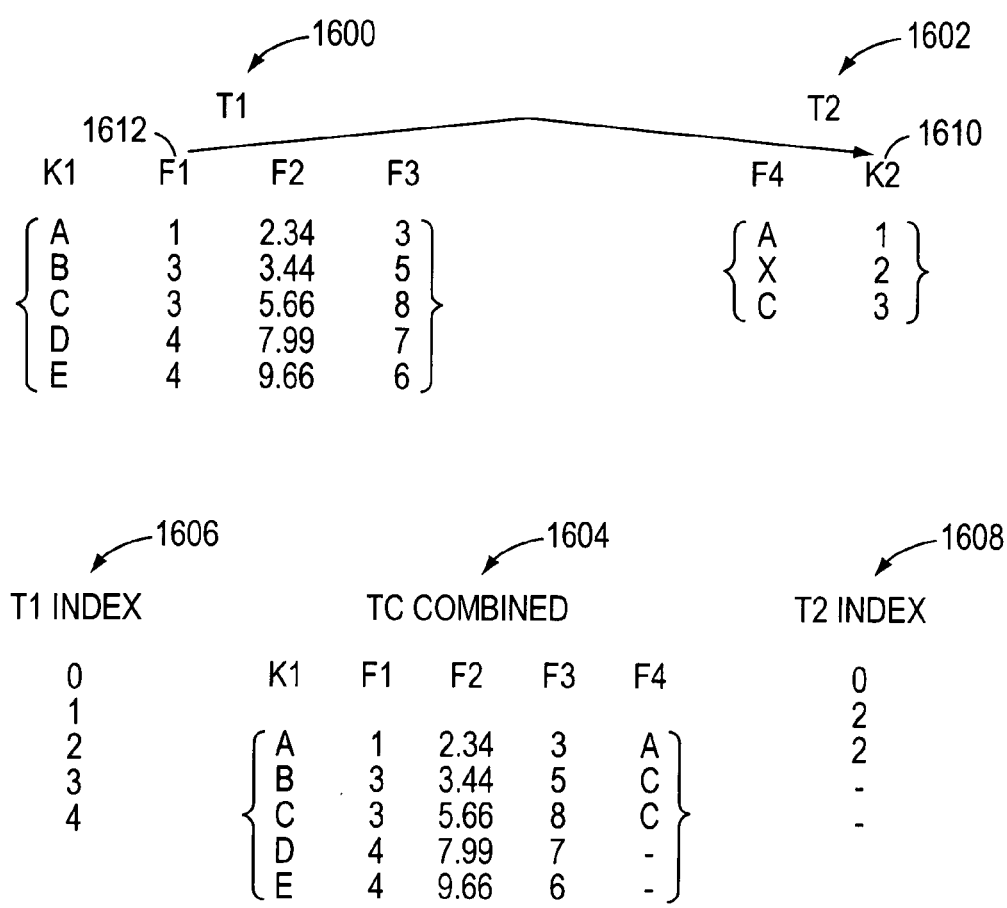

FIGS. 16A-16B show a link operation, which is used to join tables when a one-to-many relation is present. In FIG. 16A, the starting state of tables T1 (1600) and T2 (1602), and of combined table TC (1604), which is the result of applying a link operation to T1 (1600) and T2 (1602) is shown. As before, table TC (1604) is shown for illustrative purposes only, and need not actually be constructed in full, due to the use of T1 INDEX (1606) and T2 INDEX (1608), which represent the combined table TC (1604). Also as before, all of table T1 (1600), table T2 (1602), index T1 INDEX (1606), and index T2 INDEX (1608) as shown in FIG. 16A would have been generated during batch processing, and would already exist at the time that transaction processing begins.

As can be seen in FIG. 16A, the link operation takes two tables (in this case, T1 (1600) and T2 (1602), where a key (field K2 1610 of table T2 1602 in this example) of one of the tables is mapped one-to-many to a link field (field F1 1612 in this example) of the oilier table. The result is a table in which the records of the "one" table (T2 1602 in this example) have been replicated to match those of the "many" table (T1 1600 in this example). Thus, in the combined table TC 1604, each row in which F1 field 1612 matches K2 field 1610, the values corresponding to the row containing that value of K2 are replicated into combined table TC 1604. As in the previous example, the indices T1 INDEX 1606 and T2 INDEX 1608, that represent the combined table indicate which rows from the source tables map to the rows of the combined table.

Referring now to FIG. 16B, the results of performing an update edit and an insert edit that affect one of the tables being joined in the link operation are described. Entry 1620 in T1 -LOG 1622 is an edit that updates row 1 (counting from 0) of table T1 1600. Because the value of the link field F1 1612 would be changed by this operation, the values in T2 INDEX 1608 may need to be updated. The needed update to T2 INDEX 1608 as a result of this update edit are added as entry 1624 in T2 INDEX-LOG 1628, indicating that row 1 of T2 INDEX 1608 should be updated to the value 1 (i.e. row 1 of the combined table will contain values from row 1 of T2). It is also necessary to add entry 1630 to COMBINED LOG 1634, indicating the changes to row 1 of combined table TC 1604 as a result of the update.

In general, an update of a link field in the "many" table causes updates to be added to the index logs of all the "one" tables to contain the appropriate matching row values. Additionally, it causes an update to be added to the combined table log. An update to a non-key field of the "one" table causes updates to be added to the combined table log for each position in the combined table that corresponds to a position in the index of the one table that contains the row number of the row that was updated. Updates to key fields of the "one" table are typically not permitted, unless they occur due to a delete operation. Such updates are a special case, in which minimal recalculation may not be the fastest approach.

Entry 1621 of T1-LOG 1622 is an insert edit that would add a new row to table T1 1600. This insert causes addition of an insert edit as entry 1636 in T1 INDEX-LOG 1638, and an insert edit as entry 1626 of T2 INDEX-LOG 1628. Additionally the insert transaction causes entry 1632, an insert edit, to be added to COMBINED LOG 1634.

In general, an insert of a row containing a link field value into the "many" table causes inserts to be added to the index logs of all of the "one" tables, an insert to be added to the index log of the "many" table, and an insert to be added to the combined log. An insert of a new row into a "one" table may cause numerous updates to be added to the index log of that table, and the same number of updates to be added to the combined log, or nothing. This is because the new key fields may match the link fields which did not have any matching key fields before, and thus had nulls in the index vector of the "one" table wherever that link field appeared in the "many" table. On the other hand, the new key fields may not have any matches in the "many" table, in which case nothing needs to be done.

Figure 17A:
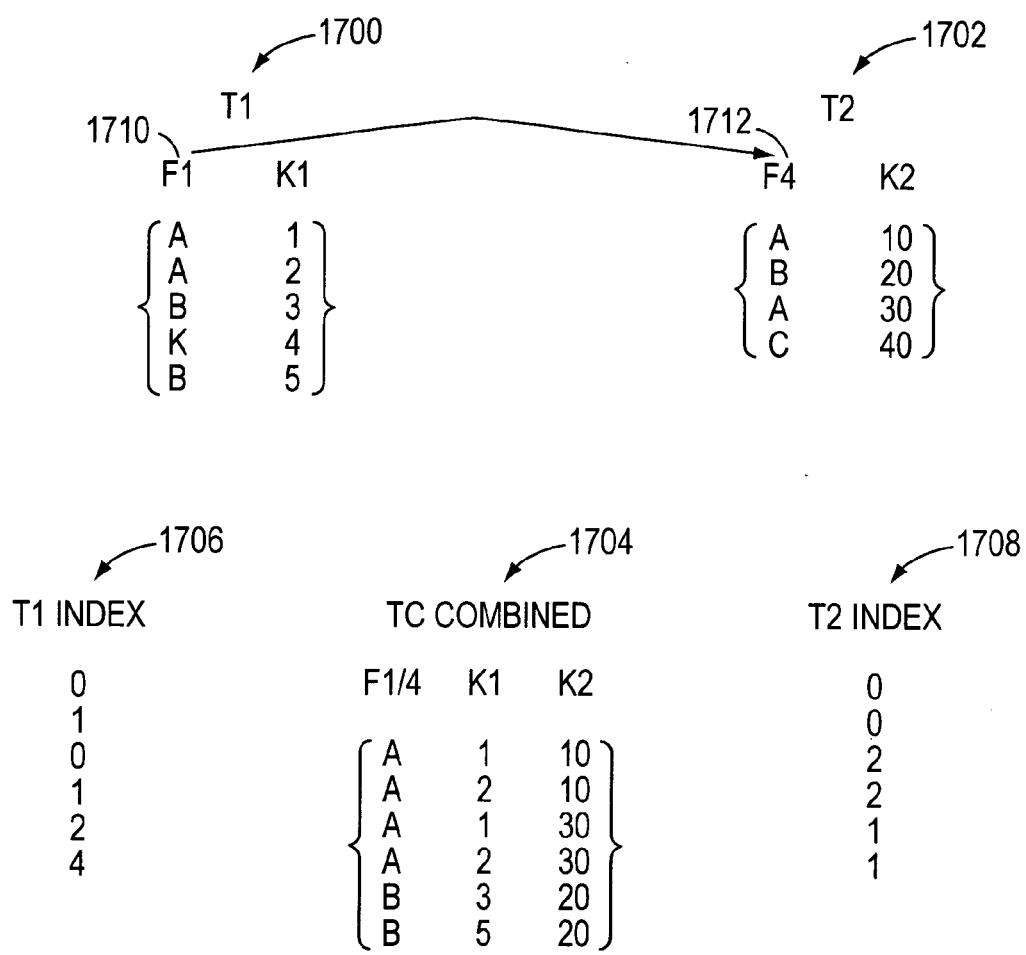
Figure 17C:
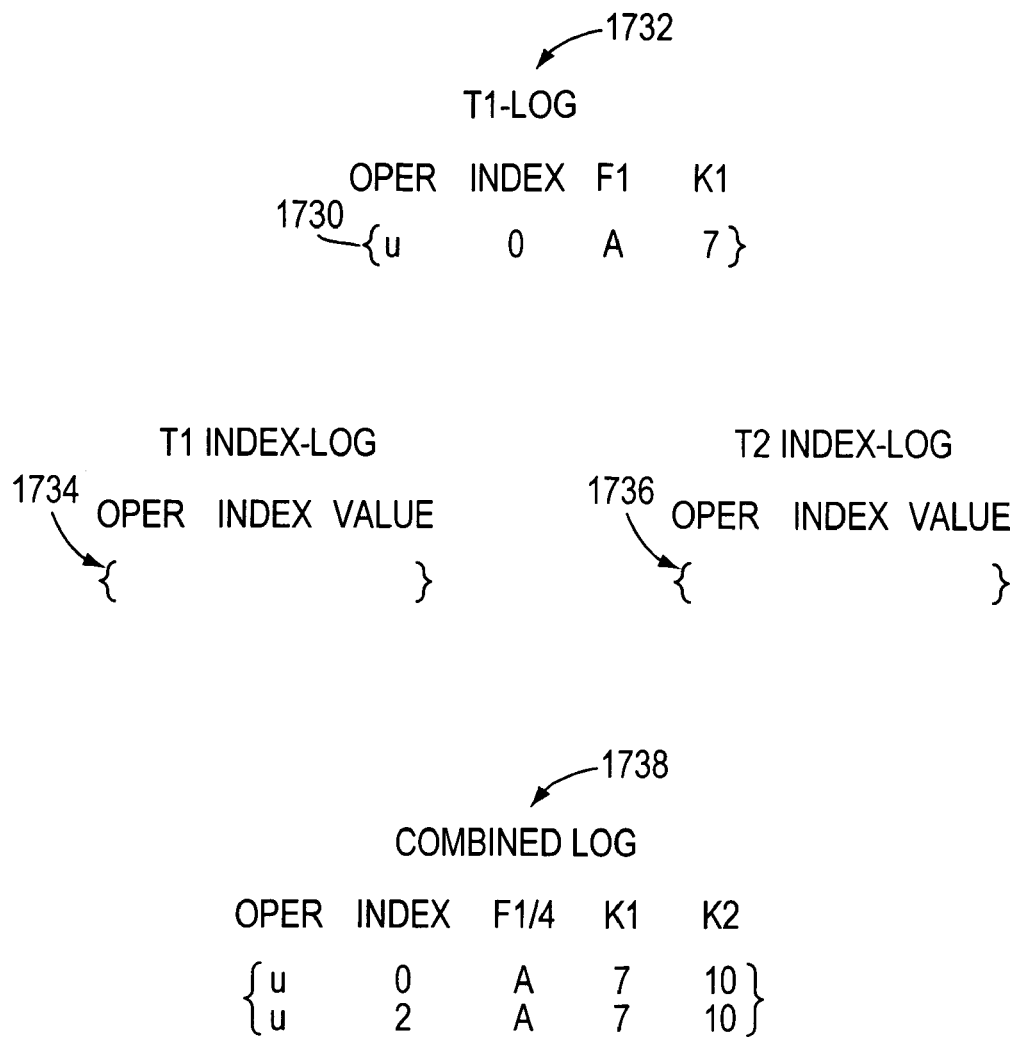

FIGS. 17A-17C illustrate a loop operation, which is used to combine tables when a many-to-many relation is present. In FIG. 17A, the starting state of tables T1 (1700) and T2 (1702), and of combined table TC (1704), which is the result of applying a loop operation to T1 (1700) and T2 (1702) is shown. As before, table TC (1704) is shown for illustrative purposes only, and need not actually be constructed in full, due to the use of T1 INDEX (1706) and T2 INDEX (1708), which represent the combined table TC (1704). Also as before, all of table T1 (1700), table T2 (1702), index T1 INDEX (1706), and index T2 INDEX (1708) as shown in FIG. 16A would have been generated during batch processing, and would already exist at the time that transaction processing begins.

As can be seen in FIG. 17A, the loop operation takes two tables (in this case, T1 (1700) and T2 (1702), where a first link field (field F1 1710 of table T1 1700 in this example) of one of the tables is mapped many-to-many to a second link field (field F4 1712 in this example) of the other table. The result is a table having a row for each combination of matching values of the first and second link fields in the two tables. Thus, in the combined table TC 1704, for each row in which a value of F1 field 1710 matches at least one value of F4 field 1712, the combined table TC 1704 will have a row combining the values of rows from T1 1700 and T2 1702 for each element in F4 field 1712 that matches the value of F1 field 1710. As in the previous examples, the indices T1 INDEX 1706 and T2 INDEX 1708, that represent the combined table indicate which rows from the source tables map to the rows of the combined table.

Referring now to FIG. 17B, the result of performing an insert edit that affects one of the tables being joined in the loop operation is described. Entry 1720 in T2-LOG 1722 is an edit that inserts a new row at the end of table T2 1702. Because this adds an additional value to field F4 1712 in T2 1702 that corresponds to two values in field F1 1710 in T1 1700, two new rows will be added to the combined table. This is reflected in the addition of two insert edits in T1 INDEX-LOG 1724, two insert edits in T2 INDEX-LOG 1726, and two insert edits in COMBINED LOG 1728.

For edits on many-to-many table operations, an insert of a row containing new or existing link field values into one of the tables, such that the new values are not present in at least one of the other tables involved in the many-to-many relation causes no effect. An insert of a row containing a new or existing link field value into one of the tables, such that the link field value is present in other tables involved in the many-to-many relation causes a number of inserts to be added to the index logs of each of the tables, and to the combined table log, equal to the product of the number of occurrences of the values in the other tables.

In FIG. 17C, the result of performing an update edit that affects one of the source tables of the loop operation is described. Entry 1730 in T1-LOG 1732 is an edit that updates a non-link field of table T1 1700. Because this only changes the values of fields in the combined table, but not the positions in table T1 1700 from which those values are taken, the update has no effect on T1 INDEX 1706 or T2 INDEX 1708. Accordingly, there are no additions to T1 INDEX-LOG 1734 or T2 INDEX-LOG 1736. The update will require an update to the combined table everyplace where the entry that is being updated occurs in the combined table. Since the value being updated occurs in combined table TC 1704 at indices 0 and 2, updates are added to the combined table log with indices 0 and 2, with the updated value.

In general, an update value to a non-link field in a loop operation causes as many updates to be added to the combined table log as there are occurrences of the row that was updated in the combined table. If the updated row is not present in the combined table, no updates will be added to the combined table log. Note that an update to a link field in a loop operation is a special case that could lead to many edits being added to the logs of the table indices and the combined table. In general, such updates should only be permitted if they result from a delete edit.

Figure 18A:
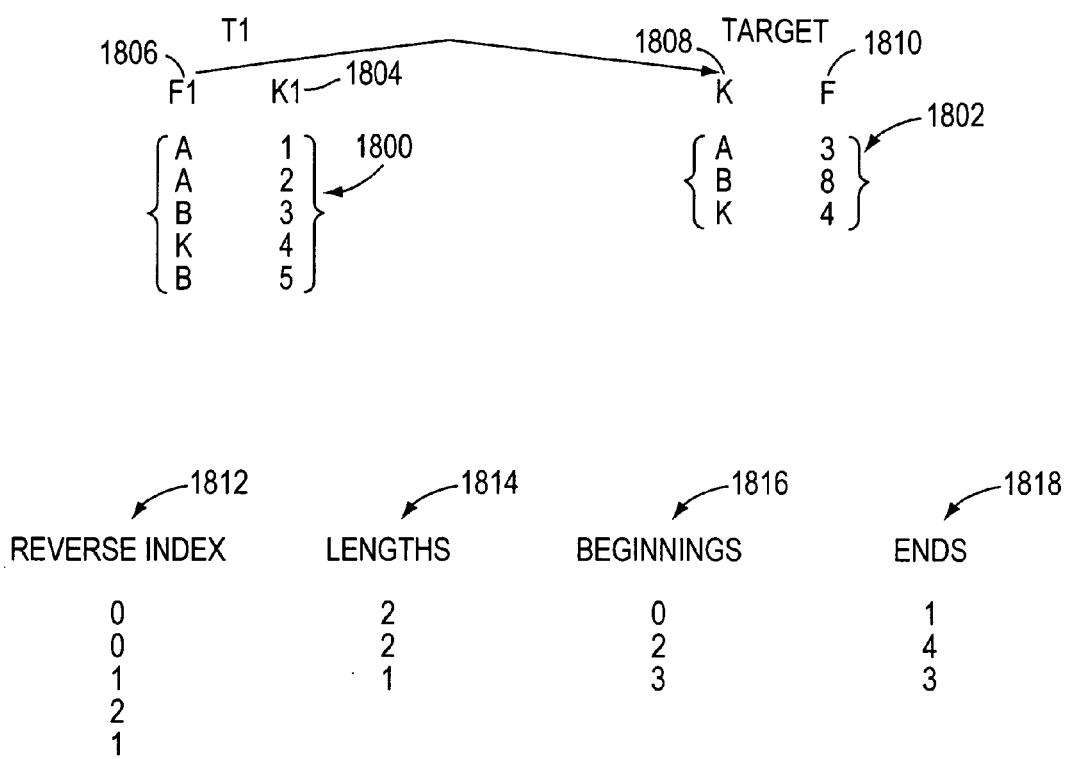
FIGS. 18A-B show an example of the handling of transactions in an aggregation operation in accord with minimal recalculation methods of the present invention.
Figure 18B:
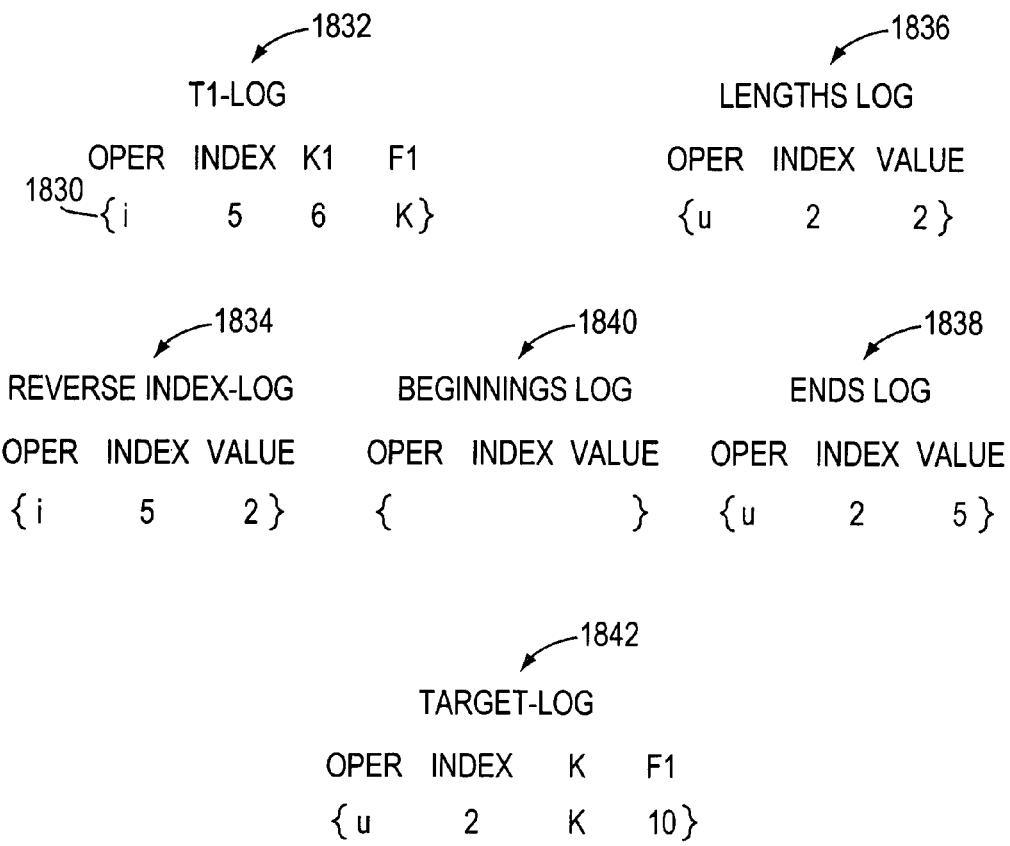

Referring now to FIGS. 18A-18B, an example of an aggregation operation is shown. Such aggregation operations are used to represent many-to-one relations, and occur only after the table rule has been applied, to convert a combined table (which results from application of various fuse, link, and loop operations) into the target table. Unlike the fuse, link, and loop operations which were described above, aggregation operations are used to compute values for fields in a target table. When transactions affect the table on which the aggregation operation occurs, these changes must be propagated through the aggregation operation, to affect the values of the target fields.

In FIG. 18A, the starting state of tables T1 1800 and the target table TARGET 1802 are shown. It should be noted that in this example, T1 is a combined table that may have resulted from operation of the join rules discussed above, such as fuse, link, and loop. In this example, the field F1 1806 in table T1 1800 is mapped many-to-one to the field K 1808 in the table TARGET 1802. To perform this mapping, all of the values in field K1 1804 that have the same values in field F1 1806 must be combined to provide a value for field F 1810 in table TARGET 1802. In this example, a SUM operation is used to combine the values from field K1 1804. Thus, in the row of table TARGET 1802 having a value in field K 1808 of "A", the value of field F 1810 will be the sum of all of the elements in field K1 1804 in table T1 1800 that have "A" as the value of field F1 1806.

In addition to the starting states of tables T1 1800 and TARGET 1802, FIG. 18A shows the starting states of numerous indices that are used perform the aggregation operation, and to handle transactions that affect table T1 1800. Reverse index 1812 contains entries for each row in table T1 1800. These entries have values that indicates which rows of table TARGET 1802 contain the result of aggregating the corresponding rows of table T1 1800. In this example, reverse index 1812 contains {0 0 1 2 1}, indicating that rows 0 and 1 of table T1 1800 will be aggregated into row 0 of table TARGET 1802, rows 2 and 4 of table T1 1800 will be aggregated into row 1 of table TARGET 1802, and row 3 of table T1 1800 will be aggregated into row 2 of table TARGET 1802.

The process of grouping rows of a combined table (such as table T1 1800) that have the same value in the "partitioning field" (a field that is mapped to a key field in the target table—field F1 1806 in this example) is known as "partitioning" the table. For each distinct value in the partitioning field, a "partitioning group" exists, that associates all rows of the many table that have the same value in their partitioning field. Generally, there will be one such partitioning group for each row in the target table of an aggregation operation. Thus, an alternative way to describe reverse index 1812 is to say that it contains the partitioning group number for each row of the many table. Thus, in this example, reverse index 1812 could be said to specify that rows 0 and 1 of table T1 1800 are in partitioning group 0, rows 2 and 4 are in partitioning group 1, and row 3 is in partitioning group 2.

Lengths index 1814 contains an entry for each partitioning group, specifying how many rows of the many table are in each partitioning group. In the example, lengths index 1814 contains {2 2 1}, indicating that partitioning group 0 contains two rows from table T1 1800, partitioning group 1 contains 2 rows, and partitioning group 2 contains 1 row.

Beginnings index 1816 contains an entry for each partitioning group, specifying the first row in the many table at which a member of that partitioning group is found. Thus, in the example shown in FIG. 5A, beginnings index 1816 contains {0 2 3}, indicating that row 0 is the first row in table T1 1800 containing a member of partition group 0, row 2 is the first row containing a member of partitioning group 1, and row 3 is the first row containing a member of partitioning group 2.

Ends index 1818 is similar to beginnings index 1816, containing an entry for each partitioning group that specifies the last row in the many table at which a member of that partitioning group is found. For example, since the last row of T1 1800 that has a value of "B" in field F1 1806 (i.e. partitioning group 1) is row 4, the entry in ends index 1818 at index 1 (counting from 0) is 4.

As in previous examples, the starting values in table T1 1800, table TARGET 1802, reverse index 1812, lengths index 1814, beginnings index 1816, and ends index 1818 will have been computed during batch processing, and will already be present when transaction processing begins.

Referring now to FIG. 18B, the results of performing a transaction that affects table T1 1800 are described. Entry 1830 in T1-LOG 1832 is an edit resulting from a transaction that will cause a new row to be added to table T1 1800, with K as the value of field F1 1806, and 6 as the value of field K1 1804. Because there is already a row in table T1 1800 that has "K" as the value of field F1 1806 (row 3), there is already a partitioning group for rows with "K" in field f1 1806 (partitioning group 2). Thus, an insert at index 5 (the index of the new row), with a value of 2 (the partitioning group of the new row) is added to reverse index log 1834.

Because the insert adds a member to partitioning group 2, the length of partitioning group 2 will increase. Thus, an update edit is added to lengths log 1836, with an index of 2 (the partitioning group for the new row), and a value of 2 (the new length of partitioning group 2). The new row also will cause an update to be added to ends log 1838, having an index of 2 (the partitioning group of the new row), and a value of 5 (the index of the new row). No changes are needed to beginnings index 1816, so the insert will not cause any entries to be added to beginnings log 1840.

Finally, the insert will cause a change to the target. To determine the new value of field F 1810 in table TARGET 1802, the sum of all the values of field K1 1804 in Table T1 1800 that are in rows belonging to partition group 2 must be computed. This can be achieved by gathering all the values of field K1 1804 for rows in partitioning group 2, and adding them together. Alternatively, this can be done incrementally, by adding the value of field K1 1804 from entry 1830 to the existing value of field F 1810 in row 2 of table TARGET 1802. The result of performing the SUM operation is 10. An update edit is added to TARGET-LOG 1842 to change the value of field F 1810 in row 2 to 10.

The examples shown above demonstrate that through use of indices and logs, edits to source tables that result from transactions may be propagated through table rules that use fuse, link, and loop operations, as well as through an aggregation operation that may occur when the combined table that results from application of a table rule is transformed into a target table. Once a table rule has been applied, as demonstrated above, field rules that compute the values of computed columns and fields may be applied.

The minimal recalculation engine performs the operations demonstrated above on batches of edits provided by transaction manager 802 through use of a set of algorithms that are described below. In one embodiment of the invention, the edits (inserts, updates, and deletes) may be regrouped according to operation as they enter the minimal recalculation engine process. That is, the edits may be separated into a block of inserts, a block of updates, and a block of deletes. Following this regrouping, the minimal recalculation engine may process each of these blocks of edits in a vectorized manner, first processing the block of inserts, then the block of updates, and then the block of deletes.

The following procedure may be used to facilitate this vectorization. First, each edit has an index number assigned to it. This index is the number of the row (counting from 0) of the table that is affected by the edit, and will be entered in the log of the table, along with the type of the edit. If the edit is an insert, the index value is the current size of the table, including any inserts in the current log that have not yet been checkpointed. If the edit is an update or delete, the current table is searched (using the range indices to optimize the search) for the key of the edit. The table log is also searched. If the key is found in the table itself, the index field of the edit is the position where the key is found in the table. If the key is found in the log, the index field is the value of the index field of the log entry in which the key is found. Note that this procedure may optionally be used in step 1914 of the "process" function of the minimal recalculation engine, as described below.

In an embodiment that uses this vectorization, the deletes are not actually done until the checkpointing, and all the inserts are at the bottom of the table, so the row numbering of the rows in the tables does not change until checkpointing occurs. This permits the edits to be separated into blocks of inserts, updates, and deletes, and to be processed in blocks without regard to the relative chronology between the inserts and updates, updates and deletes, and inserts and deletes. The chronology of the edits within each block is preserved.

Figure 19:
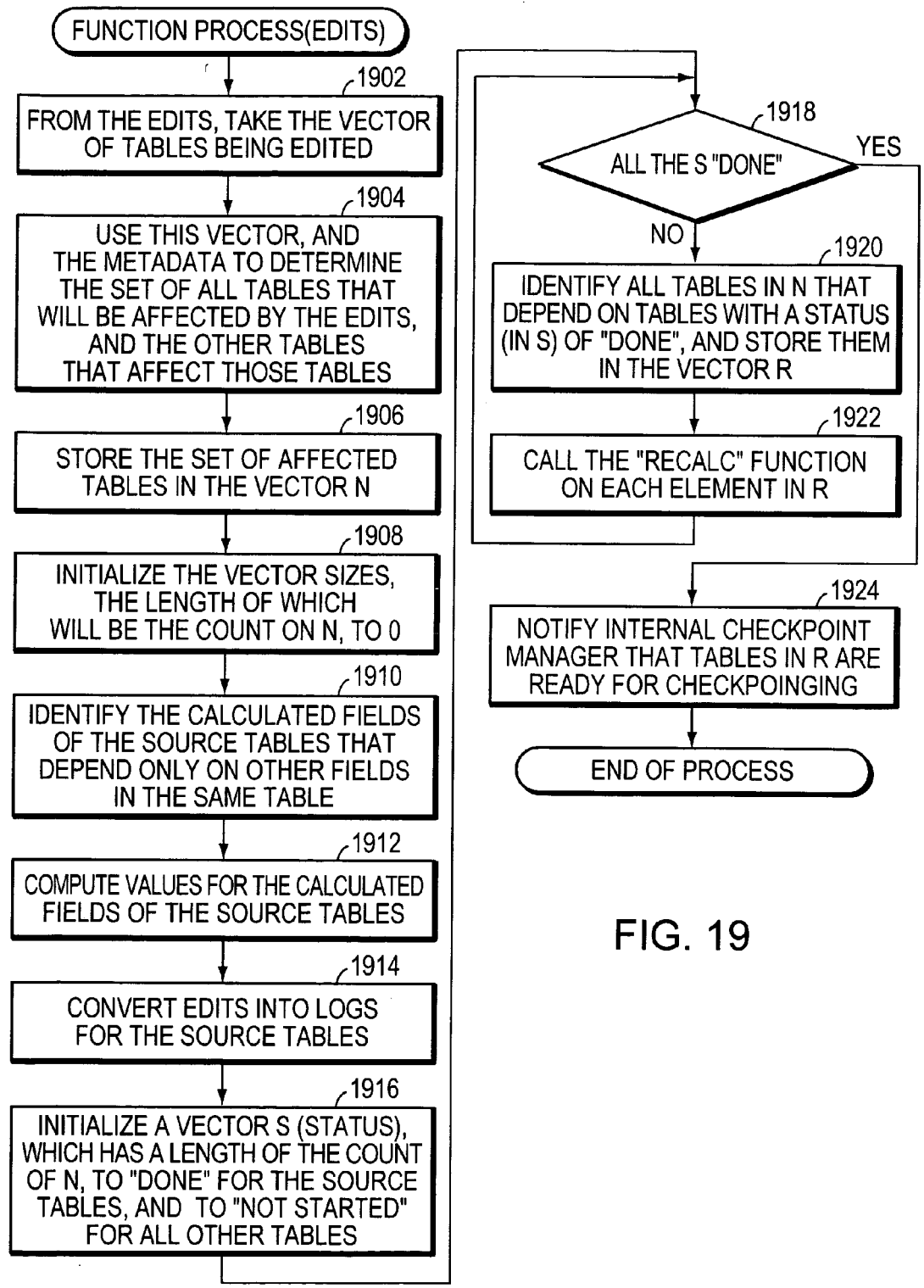
FIG. 19 is a flowchart of a "process" function of a minimal recalculation engine in accord with the present invention.

Referring to FIG. 19, a flowchart for the "process" function is described. The "process" function is executed by the minimal recalculation engine to start processing a batch of edits (which are provided as a parameter to the "process" function).

At step 1902, the system extracts from the edits a vector that identifies all of the tables that are being edited. These are the "source" tables for processing the batch of edits.

Next, at step 1904, the system identifies all the tables that will be affected by the edits, and the other tables that affect those tables. To identify these tables, the system consults the mappings that are stored in the metadata repository 204 for the model that is being applied. The set of tables produced at this step includes: (a) all the tables that depend (directly or indirectly) on the tables being edited; and (b) all the tables on which the tables identified in (a) directly depend. At step 1906, the system sets the vector N to the tables identified in step 1904.

In step 1908, the system initializes the vector SIZES, the length of which is the count of N, to contain all 0s. The SIZES vector will contain the sizes of all the intermediate tables between the sources and the targets.

In step 1910, the system identifies the calculated fields in each of the source tables (i.e. the tables being edited). These calculated fields depend only on other fields in the same table. For example, if a source table T1 has columns F1 and F2, and a column F3 where each entry in F3 is computed as the sum of a corresponding entry in columns F1 and F2, then F3 would be a calculated field in T1. In step 1912, the necessary calculations are performed to produce the calculated fields of the source tables.

At step 1914, the batch of edits is converted into logs for the source tables (i.e. the tables being edited). These logs will be used to join tables using fuse, link, and loop operations, as shown the examples described hereinabove.

At step 1916, the vector S, which contains status information on each of the tables, is initialized. The length of S is the count of N, and S is assigned a value of "done" (which may be represented by a 2) for each of the source tables, and a value of "not started" (represented by a 0) for each of the other tables. Note that S can also contain the value "in process" (represented by a 1) for tables that are currently being processed.

Next, while not all entries in S are "done" (step 1918), the system identifies all the tables in N that depend on tables that have a status in S of "done", and stores them in the vector R (step 1920). In step 1922, the "recalc" function is called for each table in R. The "recalc" function, which will be described in detail below, applies table and field rules to recalculate a table using minimal recalculation methods. In step 1924, the system notifies internal checkpoint manager 812 of the readiness for checkpointing of each table in R.

When all entries in S are "done", then the "process" function has finished processing the batch of edits that it was sent, and exits. The minimal recalculation engine that was executing the "process" function can now take a new batch of edits.

Figure 20A:
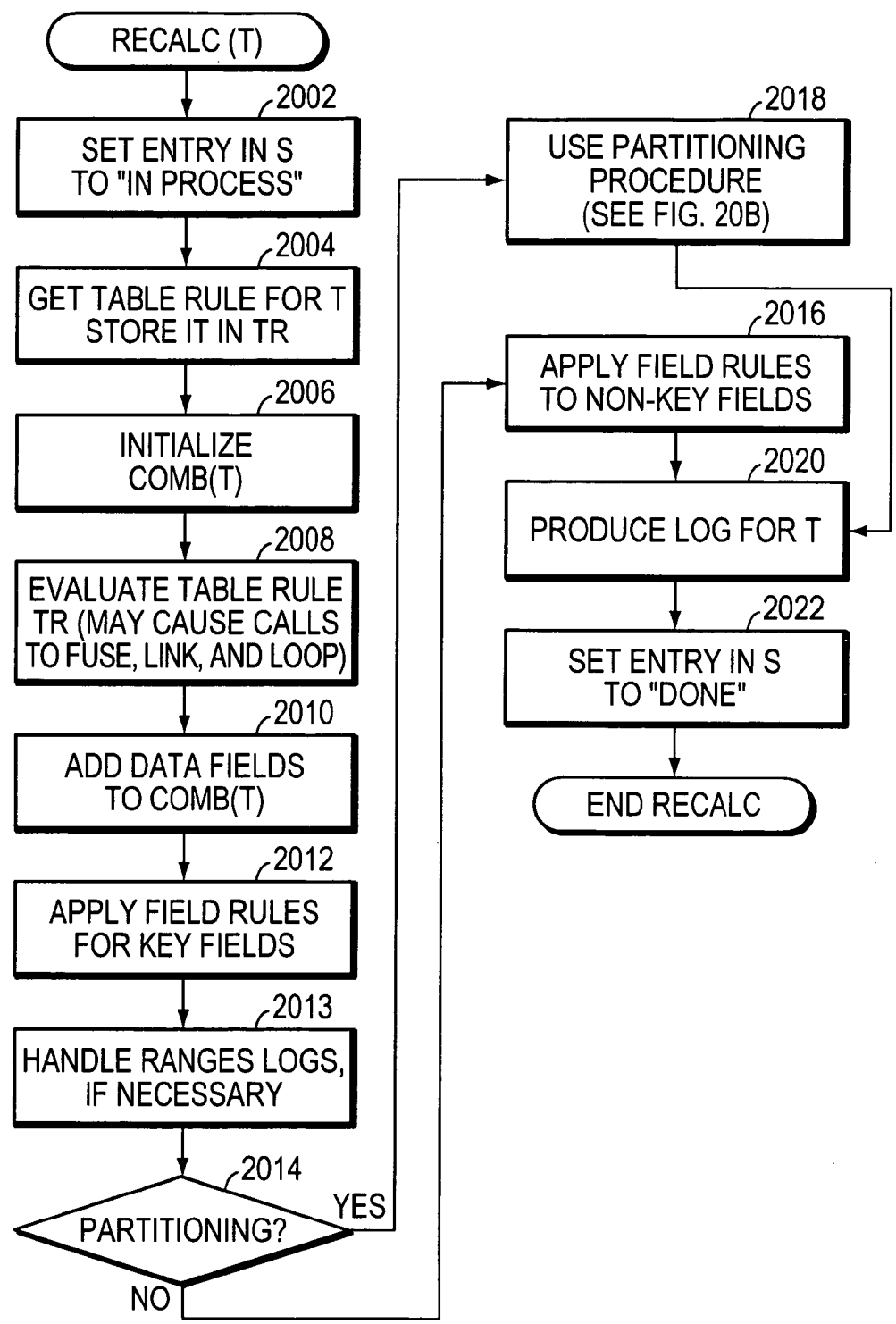
FIGS. 20A-B are a flowchart of a "recalc" function of a minimal recalculation engine in accord with the present invention.
Figure 20B:
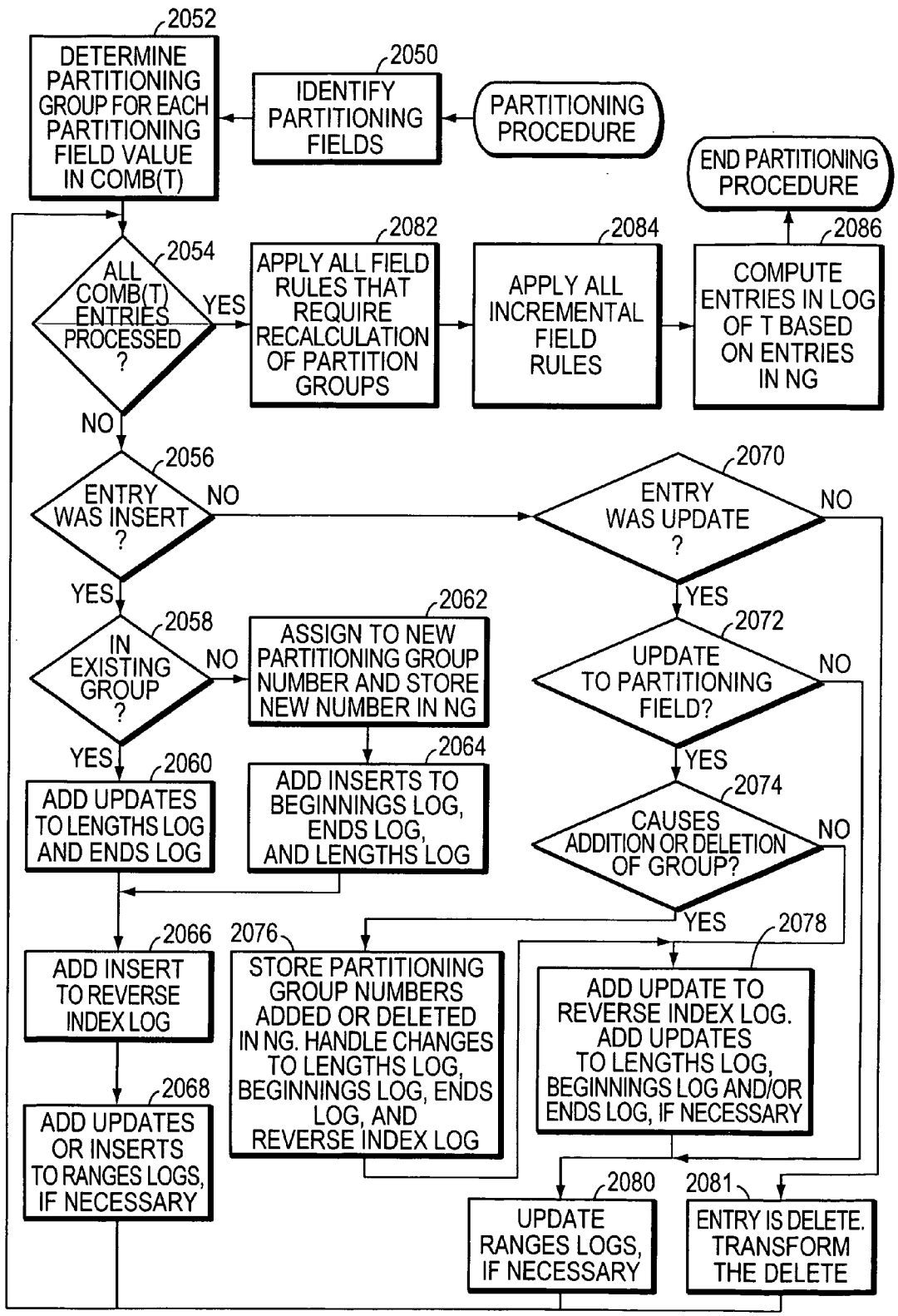

Referring now to FIGS. 20A-20B, the "recalc" function is described. Generally, the recalc function takes a table, denoted T, and applies table rules and field rules to recalculate T. In step 2002, the system sets the entry in S (the status vector) that corresponds to the table T to "in process".

In step 2004, the system retrieves the table rule for T from the metadata repository 204, and stores it in TR. As discussed above, the table rule for T generally consists of a set of fuse, link, and loop operations that may be applied to other tables to build T as a combined table. In addition to applying fuse, link, and loop operations, it may be necessary (if, for example, there is a key transformation as described above or an aggregation) to perform a partitioning.

Next, in step 2006, the system initializes COMB(T), the combined table log for T to an empty table with columns for operation and index. Note that during application of the table rule, only the operation and index are kept for the combined table log. The data fields of the combined table are added into the combined table log only after edits have been propagated through the table rule. This saves time by preventing needless adding of data fields to the combined log for entries that will be affected or removed by the application of further operations in the table rules.

In step 2008, the table rule TR is evaluated. This may require application of the "fuse," "link" and "loop" functions described hereinbelow to apply the various fuse, link and loop operations to source tables that are required to build the table T.

In step 2010, the data fields are added to the combined table log COMB(T), based on the table indices, and the data in the source tables. This populates the combined table log with data from the tables that are being joined to form the combined table.

Next in step 2012, the system runs the field rules for key fields of the target table. To perform this step, field rules for the key fields of the target are retrieved from metadata repository 204. The calculations specified in the field rules are then applied, to calculate values for the key fields. Because the values of key fields may be affected by application of such field rules, the range indices that apply to the key fields (e.g., to facilitate rapid searches of the key fields) may need to be updated. These range indicca are updated during transaction processing by adding entries to ranges logs, in a manner similar to the way in which other tables and indices are altered through use of logs during transaction processing. Thus, in step 2013, edits may be added to the ranges logs to change the range indices, if necessary.

If there is no partitioning (step 2014), the field rules are applied, adding new columns to the combined table log, COMB(T) (step 2016).

In step 2018, if there is partitioning, which may be caused if there is an aggregation (i.e. many-to-one) operation to be applied, then the partitioning procedure, described with reference to 20B, is applied. As will be described more fully below, the partitioning procedure is a portion of the recalc function that handles the special indices, such as the reverse index, and the length, beginnings, and ends indices that may be associated with a partition or aggregation operation.

Next, in step 2020, the system produces a log for T, which takes the operations and indices from the combined table log COMB(T), but takes the data from COMB(T) only for the fields that are defined in the table T. Source and intermediate fields that are not defined in the table T, but which may be needed to compute the fields in T are not moved from COMB(T) to the log of T.

Finally, in step 2022, the entry in the status vector S that corresponds to table T is set to "done".

Referring now to FIG. 20B, the partitioning procedure, which contains the additional steps of the recalc function that should be applied if there is partitioning, is described. At step 2050, the system uses the metadata for T to identify the partitioning fields. The partitioning fields are the fields in the combined table that will become the key field(s) in the target table after the aggregation operation is applied. These are the fields by which partitioning will have to be done.

In step 2052, the system takes the partitioning field values from the combined table log, COMB(T), and determines to which partitioning group each partitioning field value belongs. A partitioning group serves to collect all rows from the combined table that have the same values for their partitioning field. If the operation in the combined table log is an insert, or an update that changes the value of the partition field, then determining the partition group is achieved by searching for the value of the partition field in an existing target table that was generated during batch processing, and that has had prior updates applied. If the value is found, then the partitioning group number of the partitioning field is equal to the index (position) in the existing target table at which the value was found. If the operation in the combined table log is an update in which the partitioning field value was not changed, then the partitioning group number can be found in an existing reverse index, at the position corresponding to the index value in the update edit.

At step 2054, if all entries in the combined table log, COMB(T), have been processed, then the system proceeds to step 2082. Otherwise, use the following steps are used to process the next entry in COMB(T). One skilled in the art will recognize that looping through the individual entries is used only for illustration of the algorithm, and that it is possible to process an entire vector of entries at once.

In step 2056, if the entry was an insert and the entry belongs to an existing partitioning group (step 2058), then at step 2060, updates are added to the lengths log with an index corresponding to the partitioning group number of the entry, and a value one greater than the old value, and an update is added to the ends log, with an index corresponding to the partitioning group number, and a value equal to the index (position) of the entry in the combined table log.

If the entry does not belong to an existing partitioning group, then at step 2062, the system assigns a new partitioning group number to the value of the partitioning field in the insert entry, and stores the new partitioning group number in NG, for future use. In step 2064, the system then adds inserts to the beginnings log, the ends log, and the lengths log for the new partitioning group number. The indices of these inserts are equal to the new partitioning group number, and the values of the inserts to the beginnings log and ends log are the index (position) value from the combined table log entry, and the value for the insert to the lengths log is 1.

In step 2066, because the entry being processed is an insert, the system adds an insert to the reverse index log, with an index (position) of the index value from the entry, and a value of the partitioning group number of the value. Additionally, at step 2068, updates or inserts may be added to the log of ranges.

If the entry is an update (step 2070), and the update changes the value of a partitioning field (step 2072), then the update may change the partitioning group to which the entry belongs. In step 2074, if the update causes addition of a new partitioning group, or deletion of an existing partitioning group (or both), then at step 2076, the system stores the partitioning group numbers that were added or deleted in NG, for later use, and handles updating the length log, the beginnings log, and the ends log, as well as the reverse index log. If the update causes a new partitioning group to be added, then an insert is added to the lengths log, the beginnings log, and the ends log, as described above when an insert caused a new partitioning group to be created. If the update removes an existing partitioning group, then deletions are added to the lengths log, the beginnings log and the ends log to delete the entries that correspond to the partitioning group that has been removed.

At step 2078, an update will be added to the reverse index log, to reflect the new partitioning group of the entry. Additionally, updates are added as necessary to the lengths log, the beginnings log, and ends log.

In step 2080, the ranges logs for each of the columns of each of the tables or indices that are affected are updated added, as necessary.

In step 2081, if the entry was not an insert or update, it is a delete. As described above, the system generally transforms deletes into updates. If "physical" deletion is being used, the delete is converted into two updates, as described. Alternatively, if "logical" deletion is being used, the delete is converted into an update having "null" entries for its values. It will be understood that use of step 2081 to handle deletes is for illustrative purposes, and that there are other manners and places in the algorithm that handling of deletes can occur. For example, in one embodiment, transformation of all delete edits in a block of edits may be handled prior to processing other edits.

All the partitioning groups have been identified, and the reverse index log has been built for all entries in COMB(T), so the field rules, which aggregate the data in the entries of the partitioning groups, are applied. In step 2082, the system applies field rules that require the recalculation of the partitioning groups in their entirety to compute field values of the target table. This is done by identifying the affected partitioning groups based on the index column in COMB(T) and their corresponding entry in the reverse index (and reverse index log), and searching the reverse index and reverse index log for all the row numbers of the combined table that are needed to assemble the data for the partitioning group. These row numbers are then used with the table indices of the source tables to obtain the source data for the partitioning group. Once the source data are assembled, then an aggregation operation specified in the field rule is applied to the source data, computing the field value in the target table.

Next, in step 2084, any incremental field rules are applied to compute values of fields in the target table. Incremental field rules are certain field rules that do not require the recalculation of the entire partitioning group to calculate the aggregation operation. For example, if the aggregation rule is a SUM, the only data that are needed to compute the sum of data in a partitioning group are the old values of the SUM, the old values of the updated fields, the new values of the updated fields, and the values of the inserted fields. It is not necessary to recalculate the entire SUM. Similarly, for aggregation operations such as MAX and MIN, which compute the maximum and minimum values of the data in the partitioning group, respectively, only the old result, the old values of the updated fields, and the new values are needed to perform an incremental calculation. In the case of a COUNT operation, only the old value of the COUNT, and the number of inserts and the number of deletes are needed. In short, these operations can be done in an incremental manner, which is likely to be much more efficient than recalculating the entire group. Depending on the operation, the system gathers the required data to compute the result incrementally, and computes the result of the aggregation incrementally.

In step 2086, the system computes the log for T, which will be based on the contents of NG, which identifies new and deleted partitioning groups, as well as updated partitioning groups (as a side effect of identifying new and deleted partitioning groups). This is the last step of the partitioning procedure, after which the system will continue executing the recalc function.

Figure 21:
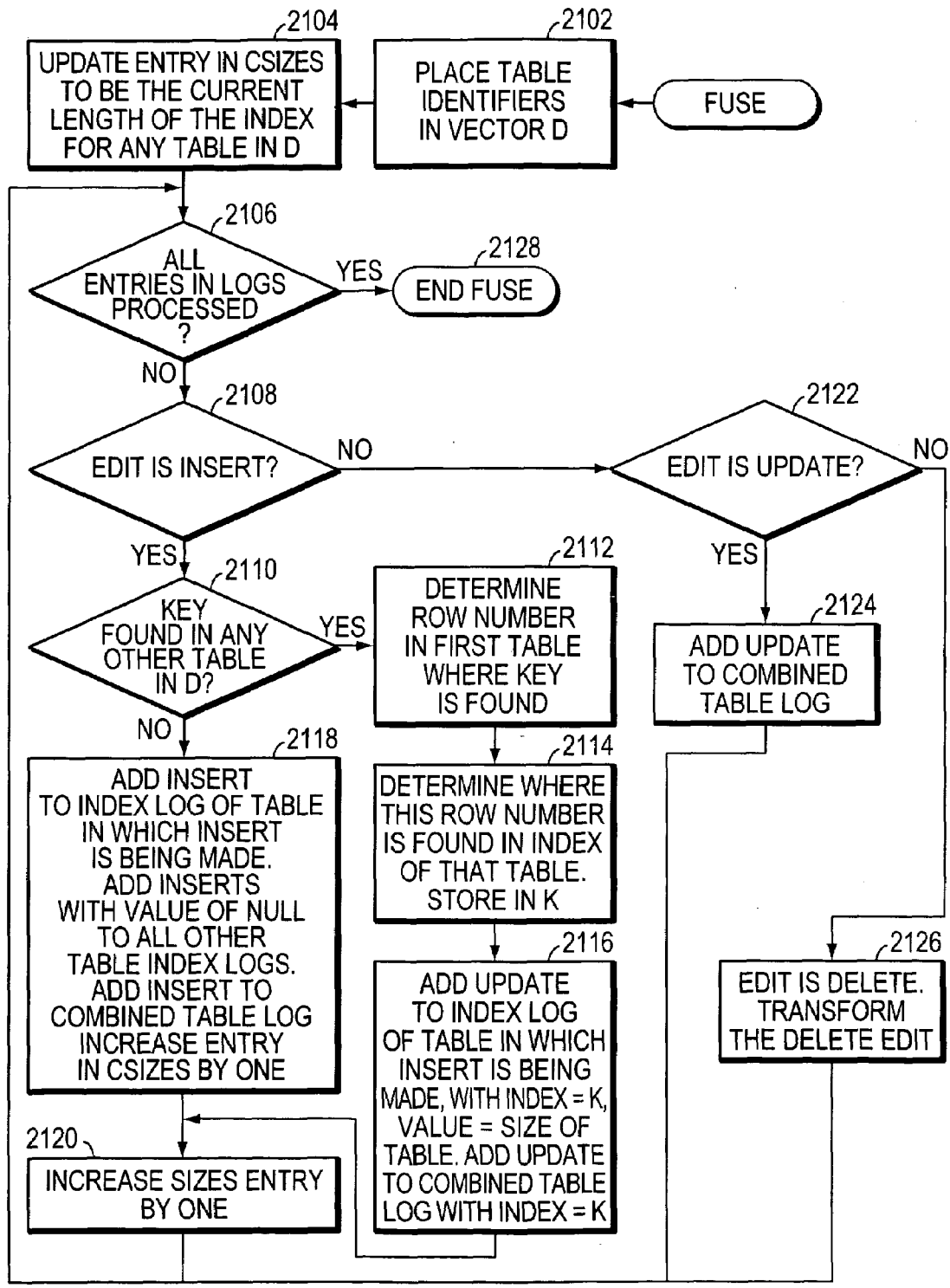
FIG. 21 is a flowchart of a "fuse" function of a minimal recalculation engine in accord with the present invention.

Referring now for FIG. 21, a flow chart for the fuse function is described. The fuse function is the function that propagates edits to tables through a fuse operation, as described hereinabove, to generate edits to the combined table, and to the indices that can be used to generate the combined table from the tables being joined by the fuse operation. The input to the fuse function is a vector of "table blobs", where each "table blob" is a pair consisting of an identifier of a table, and a log to be applied to that table.

At step 2102, the system places the table identifiers from the "table blobs", which may be numbers that identify tables, into the vector D. This is used to identify the tables involved in the fuse.

Next, at step 2104, the system updates an entry in the CSIZES vector corresponding to the combined table that will result from the fuse operation a value equal to the current length of any of the indices of the tables in D. The CSIZES vector is used to store the sizes of combined tables. The indices of the tables in D for this fuse operation have already been computed during batch processing, and, because the fuse operation represents a one-to-one mapping, the indices should all be of the same length.

At step 2106, the system checks to see if all the entries in all the logs of the tables in D have been processed. If so, the system continues to step 2128. Otherwise, the next edit is taken from one of the logs of one of the tables in D, and is processed. It will be understood by one skilled in the art that the setup of this operation as a loop, handling each edit one-at-a-time is for illustrative purposes, and that the system may handle numerous edits in the logs at once, as a vector of edits. Such vector operations, that handle entire groups of items such as edits in a log at once, are applied throughout a preferred embodiment of the system of the present invention.

If the edit is an insert (step 2108), the system checks to see if the key of the item being inserted is present in any of the other tables being fused (step 2110). If so, at step 2112, the system determines the row number in the first table where the key is found, and in step 2114, determines where this row number is found in the index vector for that table, and stores the position value in K.

At step 2116, an update is added to the index log of the table into which the insert is made. The update will be at index K, and has a value of the current size of the table (i.e. the position of the next element to be added to the table, since the table positions count from 0). Additionally, an update gets added to the combined table log with an index equal to K.

At step 2118, if the key was not present in any of the tables in D, an insert is added to index log of the table into which the original insert edit was made, with an index of the size of the combined table, and a value of the size of the table. Additionally, an insert is added to the combined table log with an index equal to the current size of the combined table (taken from CSIZES). Finally, the value in CSIZES corresponding to the combined table is incremented by one.

At step 2120, the value in SIZES for the table into which the insert was made is incremented by one.

If the edit is an update (step 2122), then, in step 2124, an update entry is added to the combined table log with an index equal to the index position of the updated row number in the table index vector of the updated table. Note that this procedure for handling updates assumes that the update does not affect a key value. As explained above, except when they result from a delete entry, updates to keys are forbidden in the fuse operation. If a legitimate update to a key field in a fuse operation occurs, it is necessary to find any matches of the old key value, and add updates or deletes to change them in the index logs and the combined table log, and find matches to the new key value, and add updates or inserts, according to whether such matches were found, to the index logs and the combined table log.

In step 2126, if the edit was not an insert or update, it is a delete. As described above, the system generally transforms deletes into updates. If "physical" deletion is being used, the delete is converted into two updates, as described. Alternatively, if "logical" deletion is being used, the delete is converted into an update having "null" entries for its key values. It will be understood that use of step 2126 to handle deletes is for illustrative purposes, and that there are other manners and places in the algorithm that handling of deletes can occur. For example, in one embodiment, transformation of all delete edits in a block of edits may be handled prior to processing other edits.

Finally, in step 2128, the fuse function is finished, and may return.

Figure 22A:
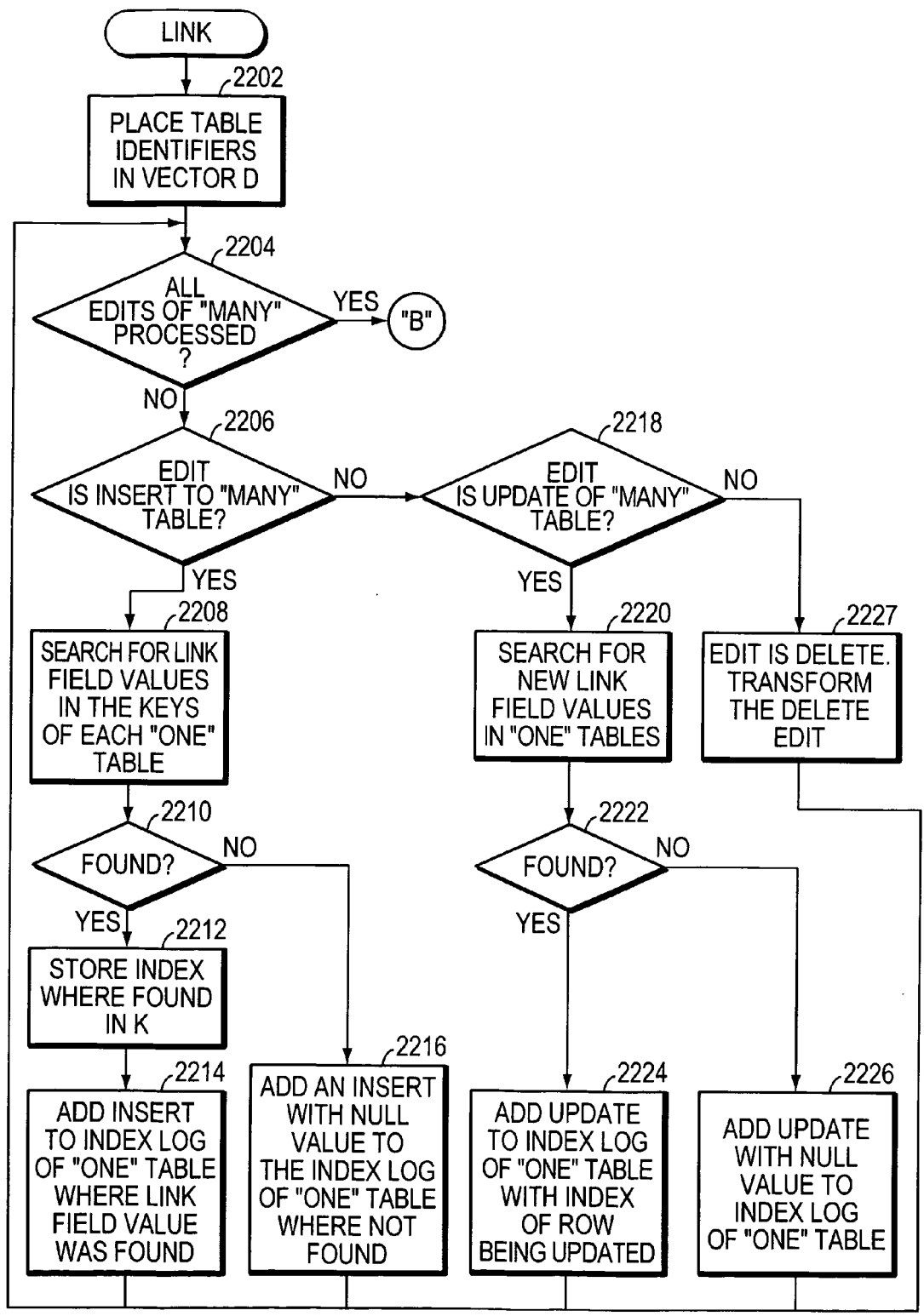
FIGS. 22A-B are a flowchart of a "link" function of a minimal recalculation engine in accord with the present invention.
Figure 22B:
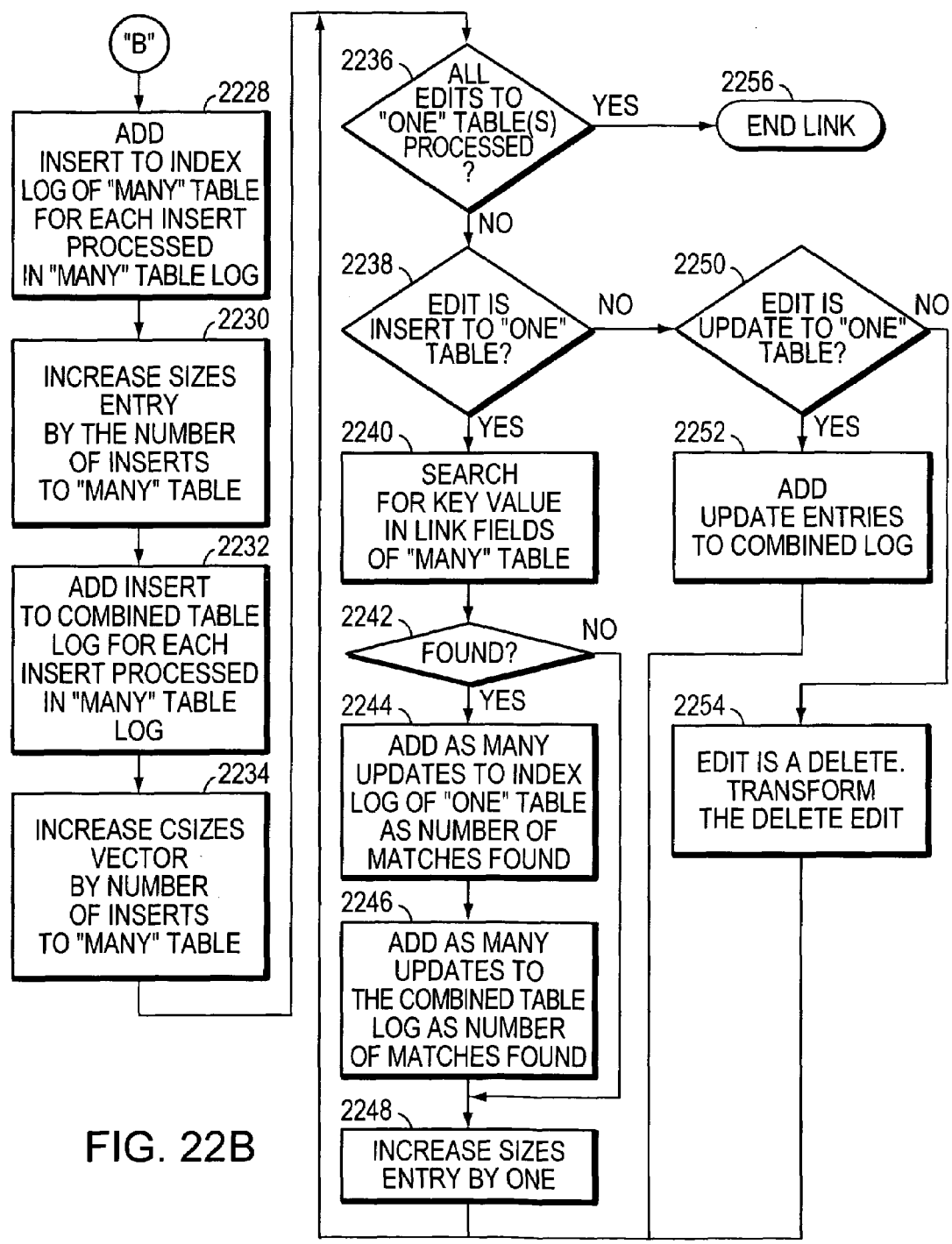

Referring now to FIGS. 22A-22B, the link function is described. The link function is the function that propagates edits to tables through a link operation, as described hereinabove, to generate edits to the combined table, and to the indices that can be used to generate the combined table from the source tables. As with the fuse function, the input to the link function is a vector of "table blobs", where each "table blob" is a pair consisting of an identifier of a table, and a log to be applied to that table.

At step 2202 in FIG. 22A, the system places the table identifiers, which may be numbers that identify tables, into the vector D. This is used to identify the tables involved in the link. The last entry in D is the "many" table, while other entries in D are "one" tables.

At step 2204, if all edits to the many table have been processed, the system proceeds to step 2228. Otherwise, the following steps are used to process the next edit to the many table. As before, one skilled in the art will recognize that looping through the individual edits is used only for illustration of the algorithm, and that it is possible to process an entire vector of edits at once.

At step 2206 the system determines if the edit is an insert to the many table. If so, at step 2208, the system searches for the link field values in the record being inserted in the keys of each of the "one" tables. If found (step 2210), the index position which the row in which the link field value was found in the one table is stored in the variable K (step 2212). At step 2214, an insert is added to the index log of the one table in which the link field value was found. The insert has an index (i.e. position) of the size of the combined table (i.e. the insert occurs at the end of the combined table), and a value of K.

If the link field value was not found, then at step 2216, an insert is added to the index log of the one table in which the link field value was not found with an index of the size of the combined table, and a value of "null".

If the edit is an update of the many table (step 2218), then the system attempts to find the occurrence of the new link field values in the one tables (step 2220). If found (step 2222), at step 2224, the system adds an update to the index log of the one table with an index equal to the number of the row being updated in the many table. The value of the update is the number of the row of the one table that matches the new link field value.

If the new link field value was not found in the one table, then at step 2226, an update is added to the index log of the one table with an index equal to the number of the row being updated in the many table, and a value of "null".

In step 2227, if the edit was not an insert or update, it is a delete. As described above, the system generally transforms deletes into updates. If "physical" deletion is being used, the delete is converted into two updates, as described. Alternatively, if "logical" deletion is being used, the delete is converted into an update having "null" entries for its key values. It will be understood that use of step 2227 to handle deletes is for illustrative purposes, and that there are other manners and places in the algorithm that handling of deletes can occur.

Continuing in FIG. 22B, at step 2228, after all the edits in the log of the many table have been processed, an insert is added to the index log of the many table for each insert that was processed in the many table log. The indices and values of the inserts are the size of the many table, with one added for each such insert.

In step 2230, the current size of the many table in the SIZES vector is increased by the number of inserts to the many table.

Next, in step 2232, the system adds an insert to the combined table log for each insert that was processed in the many table log. The indices and values of the inserts will be the size of the combined table, with one added for each such insert.

In step 2234, the current size of the combined table in the CSIZES vector is increased by the number of inserts to the many table.

Next, in step 2236, if all edits to the one table(s) have been processed, the system proceeds to step 2252. Otherwise, use the following steps are used to process the next edit to the one table(s). As before, one skilled in the art will recognize that looping through the individual edits is used only for illustration of the algorithm, and that it is possible to process an entire vector of edits at once.

In step 2238, if the edit is an insert into a one table, then at step 2240, the system searches for the key value among the link fields of the many table. If found (step 2242), at step

2244 the system adds as many updates to the index table log of the one table as the number of matches found, with indices equal to the positions in the many table at which the key value was found, and values of the size of the one table (i.e. the position in the one table at which the new entry was added). At step 2246, the system adds as many updates to the combined table log as the number of matches found, with indices of the positions in the many table at which the key value was found. Note that if the key value was not found, there is no effect.

At step 2248, the table size of the one table in the SIZES vector is increased by 1.

If the edit is an update to the one table (step 2250), then at step 2252, update entries are added to the combined table log with indices equal to the positions in the one table index at which the one table index equals the row number of the one table that was updated. Note that this assumes that the update is to a non-key field of the one table. In one embodiment, an update to a key field to the link table in the one table is permitted only when the update to the one table resulted from a delete. This is a special case, and will be discussed further hereinbelow.

At step 2254, if the edit was not an insert or update, it is a delete. As described above, the system generally transforms deletes into updates. If "physical" deletion is being used, the delete is converted into two updates, as described. Alternatively, if "logical" deletion is being used, the delete is converted into an update having "null" entries for its key values. It will be understood that use of step 2254 to handle deletes is for illustrative purposes, and that there are other manners and places in the algorithm that handling of deletes can occur.

Finally, at step 2256, the link function is finished, and returns.

Figure 23:
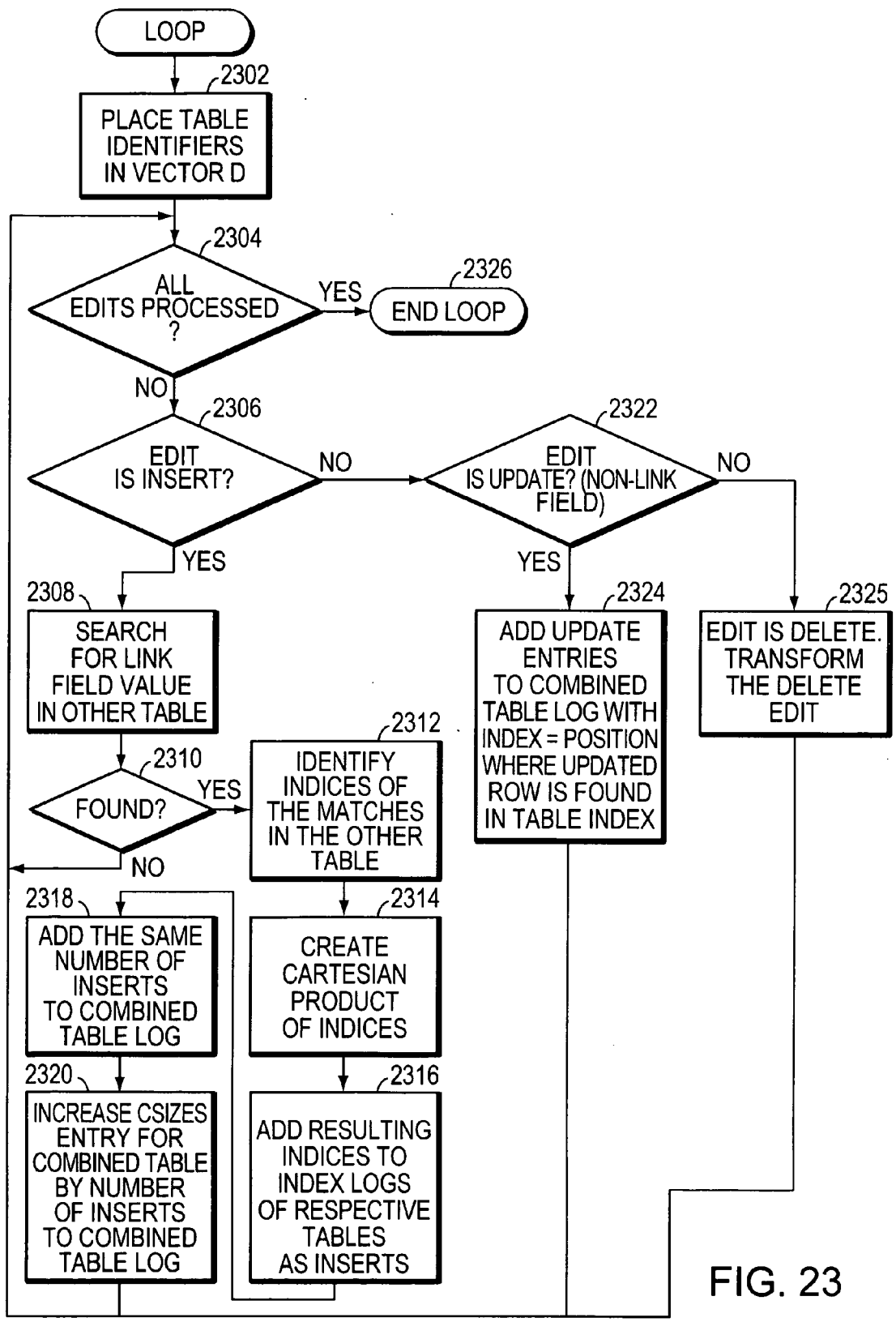
FIG. 23 is a flowchart of a "loop" function of a minimal recalculation engine in accord with the present invention.

Referring to FIG. 23, the loop function is described. The loop function is the function that propagates edits to tables through a loop operation, as described hereinabove, to generate edits to the combined table, and to the indices that can be used to generate the combined table from the source tables. As with the other function that join tables, the input to the loop function is a vector of "table blobs", where each "table blob" is a pair consisting of an identifier of a table, and a log to be applied to that table. In the case of the loop function, there should not be more than two tables combined by the loop function. If there are more than two tables to be combined in a many-to-many fashion, then the first two should be combined by a loop operation, and then the third should be combined with the result of the loop operation, and so on.

At step 2302, the system places the table identifiers, which may be numbers that identify tables, into the vector D. This is used to identify the two tables involved in the loop.

At step 2304, if all edits to the tables in D have been processed, the system proceeds to step 2326. Otherwise, the system uses the following steps to process the next edit to the many table. As before, one skilled in the art will recognize that looping through the individual edits is used only for illustration of the algorithm, and that it is possible to process an entire vector of edits at once.

If the edit is an insert (step 2306), then at step 2308, the system searches for the link field value in the other table from the table for which this edit is entered. If the link field value is found in the other table (step 2310), the system identifies the indices of the matches in the other table in step 2312. Next, in step 2314, the system creates a Cartesian product of the indices, including the indices of the edits in the table being edited. In step 2316, the resulting indices are added to the index logs of the respective tables as inserts. In step 2318, the same number of inserts are added to the combined table log, with indices starting at the size of the combined table before the edits, and counting up from that value. In step 2320, the size of the combined table stored in the CSIZES vector is increased by the number of inserts into the combined table (which is the same as the number of inserts into the indices).

If the edit was an update to a non-link field (step 2322), at step 2324, update entries are added to the combined table log with indices equal to the positions in the table index of the updated table where the number of the updated row is found. Of course, if there are no such positions in the table index, nothing will happen.

Note that an update to a link field in a loop operation is a special case that is preferably not permitted unless it results from a delete. If such an update does occur, it is a special case, similar to an update of a key field in the one table in a link operation, in which extensive recalculation may be necessary, and use of the minimal recalculation algorithms may not be appropriate.

In step 2325, if the edit was not an insert or update, it is a delete. As described above, the system generally transforms deletes into updates. If "physical" deletion is being used, the delete is converted into two updates, as described. Alternatively, if "logical" deletion is being used, the delete is converted into an update having "null" entries for its key values. It will be understood that use of step 2325 to handle deletes is for illustrative purposes, and that there are other manners and places in the algorithm that handling of deletes can occur. For example, in one embodiment, transformation of all delete edits in a block of edits may be handled prior to processing other edits.

Finally, in step 2326, the loop function is finished, and returns.

In several special cases in the algorithms described above, such as updating a key field of the "one" table in a link operation, or updating a link field in a loop operation, it has been noted that extensive changes may result, and use of the minimal recalculation algorithms may not be appropriate. In such cases, it may actually be less costly in computation time to simply recalculate the table than to handle the various edits and logs that are normally used by the minimal recalculation algorithms. In such cases, minimal recalculation engine 810 may perform a complete recalculation, or, in an alternative embodiment, recalculation can be deferred in these cases, and handled in batch mode.

Not every such change will necessarily lead to such extensive updates that complete recalculation is preferable over use of the minimal recalculation algorithms. Depending on the value being updated, even these special cases may require only a few changes to the resulting combined table. Heuristics may be used to determine, in each such special case, whether minimal recalculation is preferable over complete recalculation. If so, then minimal recalculation techniques, of inserting edits in the various logs, may be used to perform the edits.

Figure 24:
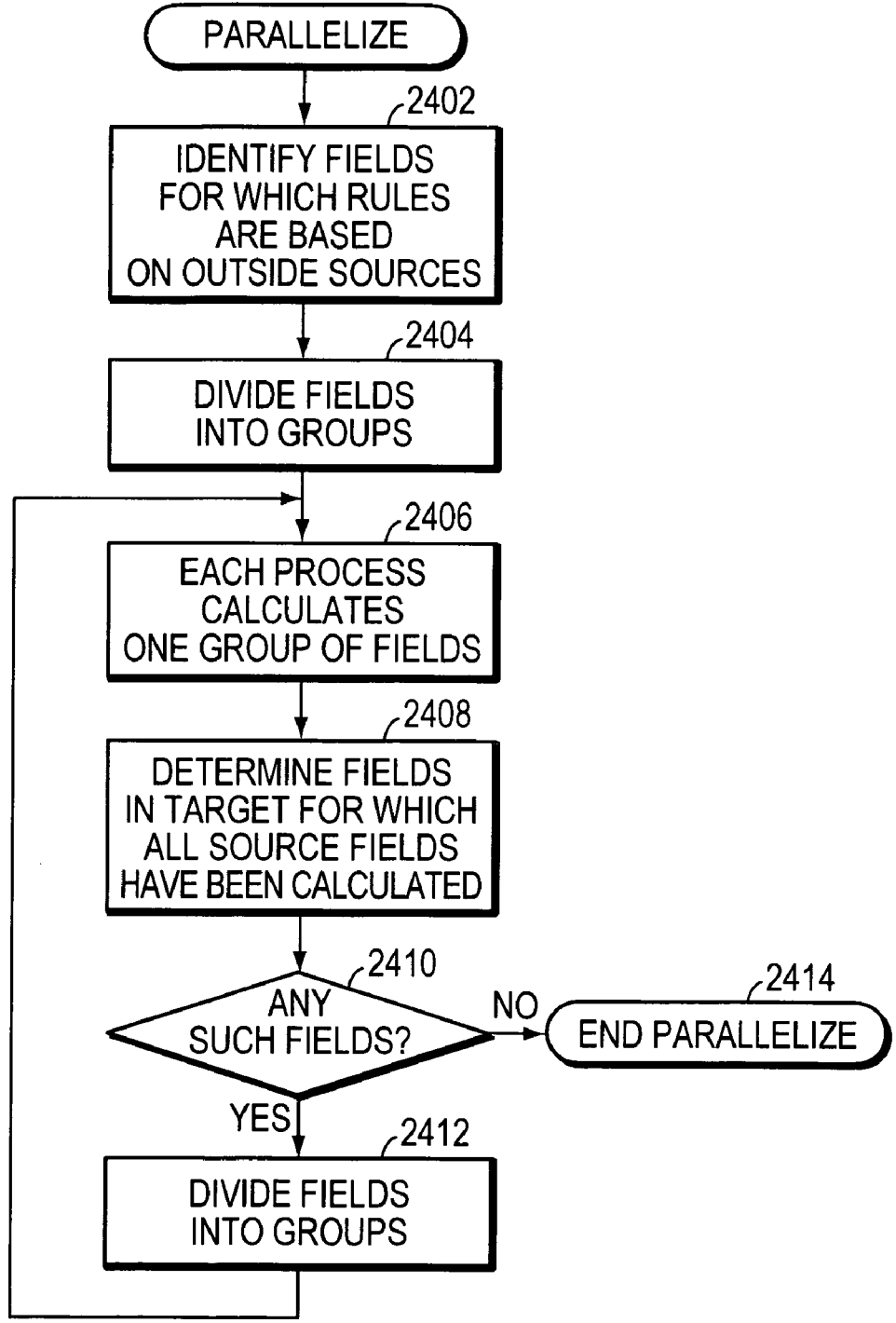
FIG. 24 is a flowchart showing the application of field rules in a parallelized manner, in accord with the present invention.

Referring now to FIG. 24, an algorithm for parallelizing the calculation of individual fields in a target table is shown. The algorithm assumes that a certain number of processes run in parallel. In a preferred embodiment, this number is determined dynamically, based on the resources of the machine, and a user-specified set of configuration parameters. This algorithm could be used, for example, in steps 2012 or 2016 of the recalc function as described herein with reference to FIG. 20A.

In step 2402, the system identifies the fields for which the rules affecting those fields are entirely based on the fields of sources outside of the table to which the field rules are being applied.

Next, in step 2404, these fields are divided into as many groups as there are available processes to compute them. The choice of which fields to place in which groups is preferably based on a measure of the complexity of the computation. One simple measure is the count of the fields. Other such measures include measures based on data gathered during previous calculations, measures based on the number of operations in a calculation, or other known complexity measures.

In step 2406, since the groups of fields have been formed, the system causes each process to calculate one group of fields.

In step 2408, as soon as a process is done with calculating its group, the system determines if there are any fields of the target for which all the source fields have been calculated. If not (step 2410), the process exits (step 2414), and its resources may be used when a process completes calculating and there are further fields that may now be calculated.

In step 2412, if there were fields for which all of the source fields have been calculated, then the fields are divided into as many groups as there are processes available, in a similar manner to that described in step 2404. The system then loops back to step 2406.

When there are no more fields that can be calculated, all processes will have reached step 2414, and the calculation of fields is complete.

Checkpointing—Operation of the Internal Checkpoint Manager

Once the logs for a target table are generated by the minimal recalculation engine, the logs may be applied to update the target table, as well as the various indices that were used to generate it. This process, referred to as checkpointing, performs the table update in a matter such that it is fault—recoverable (i.e. can be restarted after interruption without loss of data). In a preferred embodiment, this checkpointing is non-blocking, meaning that the system does not need to wait while the checkpointing is done before proceeding to process the next batch of transactions. Handling this checkpointing is the task of internal checkpoint manager 812.

Figure 25:
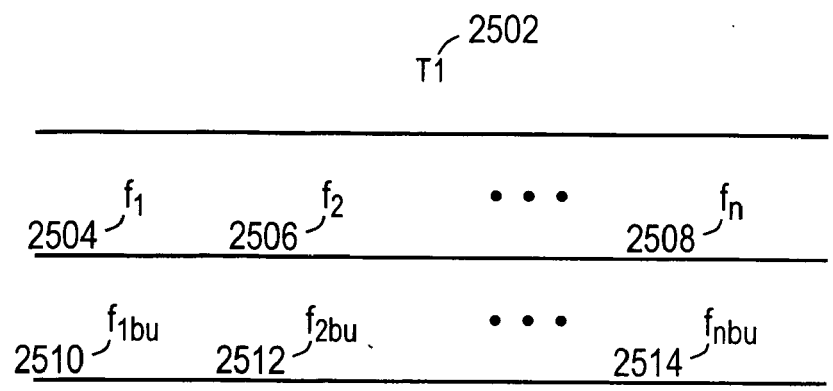
FIG. 25 shows fields of a table and backup fields of a table, used in a checkpointing operation in accord with the present invention.

Referring to FIG. 25, when minimal recalculation engine 810 has computed the effects of a batch of transactions on target table T1 2502, internal checkpoint manager 812 is invoked for the table. Since internal checkpoint manager 812 performs its checkpointing asynchronously, minimal recalculation engine 810 may immediately proceed with calculation of the next target table, even if that target table depends on the values of table T1 2502.

Table T1 2502 has fields f1 2504, f2 2506, and so on, through fn 2508. There are also backups of these fields, f1 bu 2510, f2 bu 2512, and so on, through f1 bu 2514. These backups may be referred to as "shadow memory", and are used to permit the logs to be applied asynchronously. Internal checkpoint manager 812 applies the logs to the backups of the fields, so that there will not yet be any effect on the data that may be in use by minimal recalculation engine 810.

When internal checkpoint manager 812 is finished applying the logs, fields f1 2504, f2 2506, through fn 2508 will still contain the old data, but backup fields f1 bu 2510, f2 bu 2512, through fnbu 2514 contain new field data.

The next time that all minimal recalculation engine(s) 810 finish with processing a group of transaction batches, the backup fields and the regular fields are swapped, so that the regular fields (i.e. the old data) become the backup fields, and the backup fields (i.e. the new data) become the regular fields. The swap is done by renaming the fields, rather than physically swapping the data, so it is a very fast and inexpensive operation. During the very brief period of time during which the swap is taking place, the minimal recalculation engine(s) 810 is required to wait, so that when it starts processing the next group of transaction batches, it will generate logs based on the new field values of T1 2502. When this renaming occurs, the logs are also sent to the external checkpoint manager 814. Note that the period during which this swap operation is performed corresponds to the "checkpoint 1" state described with reference to FIG. 13.

After the swap takes place, the backup fields once again contain the old values for the fields of table T1 2502, so final checkpointing must take place, during which the same logs are applied to the backup fields. Once this is done, the regular fields and the backup fields are the same, and checkpointing is complete. The logs may be stored for archival purposes, but it is no longer necessary to keep them in memory. Note that this second phase of checkpointing, during which the logs are being applied to the backup fields, corresponds to the "checkpoint2" state described with references to FIG. 13.

Operation of the External Checkpoint Manager

The logs are also sent to external checkpoint manager 814. External checkpoint manager 814 publishes the changes to target tables for which there are subscribers, such as the OLAP server. The logs are not applied by external checkpoint manager 814. Rather, they are forwarded to the various subscribers, who may apply the logs, analyze the logs, or perform any other operations to the logs, and to a snapshot of the original data (i.e. before applying logs) of the target tables to which they subscribe.

When a log gets too large, external checkpoint manager 114 may block, and apply the log, and let the subscribers know that a new version of the table to which they subscribe is now available. Note that in order to permit subscribers to have a nearly real-time view of the changes to the tables to which they subscribe, such blocking operations and resending of the entire table should be done infrequently. Typically it is more expensive for subscribers to a target table to re-read the entire table than to receive the incremental changes that have been made to that table in the form of a log.

In a preferred embodiment, external checkpoint manager 814 communicates with subscriber applications using a published protocol, so that new subscriber applications can be built to communicate with external checkpoint manager 814.

A preferred embodiment of external checkpoint manager 814 provides access to files in database 200 in which columns of the logs are stored. Since information is continually being added to the column files of the logs, external checkpoint manager 814 may take advantage of the fact that such files are contiguous in memory, and that changes to the logs are always appended to the end of the logs to provide a subscriber with a view of the column files for the logs that is static. This is done by sending subscribers header information about the column files that indicates that the subscriber should read (or map into memory) only a portion of the column files (which may be growing) that was present at the time that external checkpoint manager 814 published to subscribers that the logs had been updated.

Many alterations and modifications may be made by those having ordinary skill in the art without departing from the spirit and scope of the invention. Therefore, it must be expressly understood that the illustrated embodiments has been shown only for the purposes of example and should not be taken as limiting the invention. The invention should therefore be read to include all equivalent elements for performing substantially the same function in substantially the same way to obtain substantially the same result, even though not identical in other respects to what is shown and described in the above illustrations.

What is claimed is:

1. A method for checkpointing in a transaction processing system in communication with a plurality of systems external to the transaction processing system, the method comprising:

specifying a plurality of systems external to the transaction processing system that are each in communication with the transaction processing system and are each subscribers to a common data table, wherein one or more of the subscribers comprises an application server;

communicating to each of the specified subscribers a copy of the data table for storing by each of the subscribers as a local copy of the data table; and communicating log entries to the each of the specified subscribers, the log entries comprising changes to the data table resulting from transactions affecting the data table, and wherein the log entries comprise change data provided to a checkpointing subsystem.

2. The method of claim 1 wherein one or more of the subscribers comprises an OLAP server.

3. The method of claim 2, further comprising, receiving, by one OLAP server, the copy of the data table, and storing the copy of the data table as a local copy of the data table.

4. The method of claim 3, further comprising, receiving by the one OLAP server the log entries.

5. The method of claim 4, further comprising applying, by the one OLAP server, the log entries to the local copy of the data table.

6. The method of claim 2, wherein one OLAP server performs additional operations on the log entries before applying them to its copy of the data table.

7. The method of claim 1, further comprising the steps of: determining whether a number of log entries is above a predetermined threshold;

applying the log entries to the data table, and communicating an updated data table to the subscribers if the number of log entries is above a predetermined threshold; and communicating to the specified subscribers additional log entries, the additional log entries comprising further changes to the data table resulting from transactions, if the number of log entries is not above the predetermined threshold.

8. A method for checkpointing in a transaction processing system in communication with a system external to the transaction processing system, the method comprising:

specifying a system external to the transaction processing system that is in communication with the transaction processing system to be a subscriber to a data table;

communicating a copy of the data table to the specified subscriber;

communicating log entries to the specified subscriber, the log entries comprising changes to the data table resulting from transactions affecting the data table;

determining whether a number of log entries is above a predetermined threshold;

applying the log entries to the data table, and communicating an updated data table to the subscriber if the number of log entries is above a predetermined threshold; and communicating to the specified subscriber additional log entries, the additional log entries comprising further changes to the data table resulting from transactions, if the number of log entries is not above the predetermined threshold.

9. The method of claim 8 wherein the subscriber comprises an OLAP server.

10. The method of claim 9, further comprising, receiving, by the OLAP server, the copy of the data table, and storing the copy of the data table as a local copy of the data table.

11. The method of claim 10, further comprising, receiving by the OLAP server the log entries.

12. The method of claim 11, further comprising applying, by the OLAP server, the log entries to the local copy of the data table.

13. The method of claim 9, wherein the OLAP server analyzes the log entries.

14. The method of claim 9, wherein the OLAP server performs additional operations on the log entries before applying them to its copy of the data table.

15. The method of claim 8 wherein the log entries comprise change data provided to a checkpointing subsystem.

16. The method of claim 8, further comprising, prior to the step of communicating log entries, computing the effects of a batch of transactions on the data table.

17. The method of claim 16, further comprising storing the effects of the batch of transactions on the data table as log entries.

18. The method of claim 8, wherein: the specifying step further comprises specifying a plurality of systems external to the transaction processing system that are each in communication with the transaction processing system and are each subscribers to the data table;

communicating the data table comprises communicating to each of the specified subscribers a copy of the data table; and communicating log entries comprises communicating log entries to the each of the specified subscribers.

* * * * *